(12) United States Patent
Yu et al.

(10) Patent No.: US 8,990,783 B1
(45) Date of Patent: *Mar. 24, 2015

(54) SCHEDULING GENERATED CODE BASED ON TARGET CHARACTERISTICS

(75) Inventors: Biao Yu, Sharon, MA (US); Jim Carrick, Natick, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1073 days.

This patent is subject to a terminal disclaimer.

(21) Appl. No.: 13/016,613

(22) Filed: Jan. 28, 2011

Related U.S. Application Data

(63) Continuation-in-part of application No. 12/540,960, filed on Aug. 13, 2009, now Pat. No. 8,566,804.

(51) Int. Cl.
*G06F 9/44* (2006.01)
*G06F 9/45* (2006.01)
*G06F 9/46* (2006.01)
*G06F 9/30* (2006.01)

(52) U.S. Cl.
CPC ...................................... *G06F 9/30* (2013.01)
USPC ............. 717/131; 717/135; 703/22; 718/103; 718/107

(58) Field of Classification Search
USPC .......................................................... 717/131
See application file for complete search history.

(56) References Cited

U.S. PATENT DOCUMENTS

| | | | |
|---|---|---|---|
| 5,875,464 A | 2/1999 | Kirk | |
| 6,178,533 B1* | 1/2001 | Chang | 714/739 |
| 7,010,788 B1* | 3/2006 | Rehg et al. | 718/100 |
| 7,386,586 B1 | 6/2008 | Headley et al. | |
| 8,566,804 B1 | 10/2013 | Carrick et al. | |
| 2001/0016807 A1 | 8/2001 | Hashima et al. | |
| 2002/0052726 A1 | 5/2002 | Tajima et al. | |
| 2002/0120663 A1* | 8/2002 | Binns | 709/103 |
| 2004/0073906 A1 | 4/2004 | Chamdani et al. | |
| 2004/0083477 A1 | 4/2004 | Acharya et al. | |
| 2004/0153469 A1 | 8/2004 | Keith-Hill | |
| 2004/0261063 A1 | 12/2004 | Wang et al. | |
| 2005/0160397 A1 | 7/2005 | Szpak et al. | |

(Continued)

OTHER PUBLICATIONS

"STORM: Simulation Tool for Real-time Multiprocessor Scheduling—User Guide V3.2" May 2009, Institut de Recherche en Communications et Cybernetique de Nantes.*

(Continued)

*Primary Examiner* — James D Rutten
(74) *Attorney, Agent, or Firm* — Harrity & Harrity, LLP

(57) ABSTRACT

Embodiments can include computer-implemented methods or non-transitory computer readable media storing executable instructions. The method or instructions can perform execution scheduling for code generated from an executable graphical model, where the generated code is executed on a target. The method/instructions can perform execution scheduling for a first code portion having a first execution rate, and a second code portion having a second execution rate that is temporally related to the first execution rate. The execution scheduling can account for target environment characteristics obtained from a target, can use an execution schedule, and can account for optimizations related to the first code portion or the second code portion. The method/instructions can further schedule execution of the first code portion and the second code portion in generated executable code based on the performing.

38 Claims, 30 Drawing Sheets

(56) References Cited

U.S. PATENT DOCUMENTS

| | | |
|---|---|---|
| 2006/0200795 A1* | 9/2006 | MacLay ........................ 717/106 |
| 2007/0074217 A1 | 3/2007 | Rakvic et al. |
| 2008/0022270 A1 | 1/2008 | Morrow et al. |
| 2008/0155550 A1 | 6/2008 | Tsafrir et al. |
| 2008/0215768 A1 | 9/2008 | Reid et al. |
| 2009/0201303 A1 | 8/2009 | Westerhoff et al. |
| 2010/0122105 A1 | 5/2010 | Arslan et al. |

OTHER PUBLICATIONS

Co-pending U.S. Appl. No. 12/540,960, filed Aug. 13, 2009 entitled "Scheduling Generated Code based on Target Characteristics" by James Carrick et al., 88 pages.

Singhoff et al., "Cheddar: A Flexible Real time Scheduling Framework." In Proceedings of the 2004 Annual ACM SIGAda International Conference on Ada: The Engineering of Correct and Reliable Software for Real-Time & Distributed Systems Using Ada and Related Technologies (SIGAda '04), ACM, New York, NY, USA, 1-8, 2004.

Cervin et al., "How Does Control Timing Affect Performance? Analysis and Simulation of Timing Using Jitterbug and TrueTime," Control Systems, IEEE. vol. 23, No. 3, pp. 16-30, Jun. 2003.

Co-pending U.S. Appl. No. 14/058,917, filed Oct. 21, 2013, by James E. Carrick et al., entitled "Scheduling Generated Code Based on Target Characteristics", 88 pages.

* cited by examiner

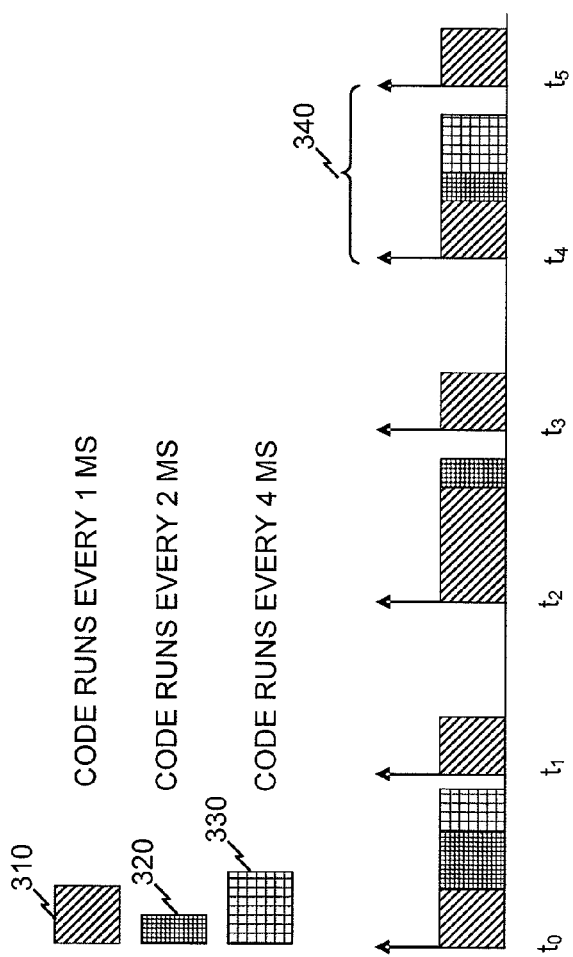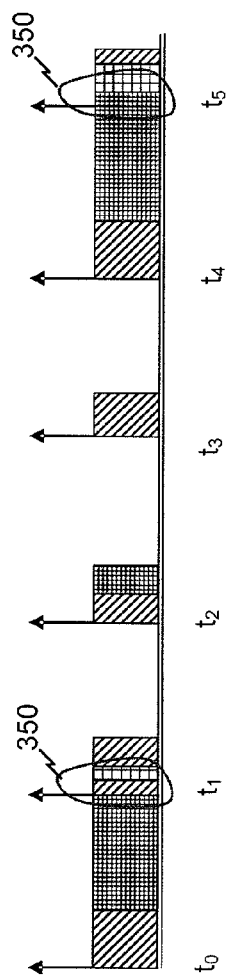
FIG. 3A
FIG. 3B

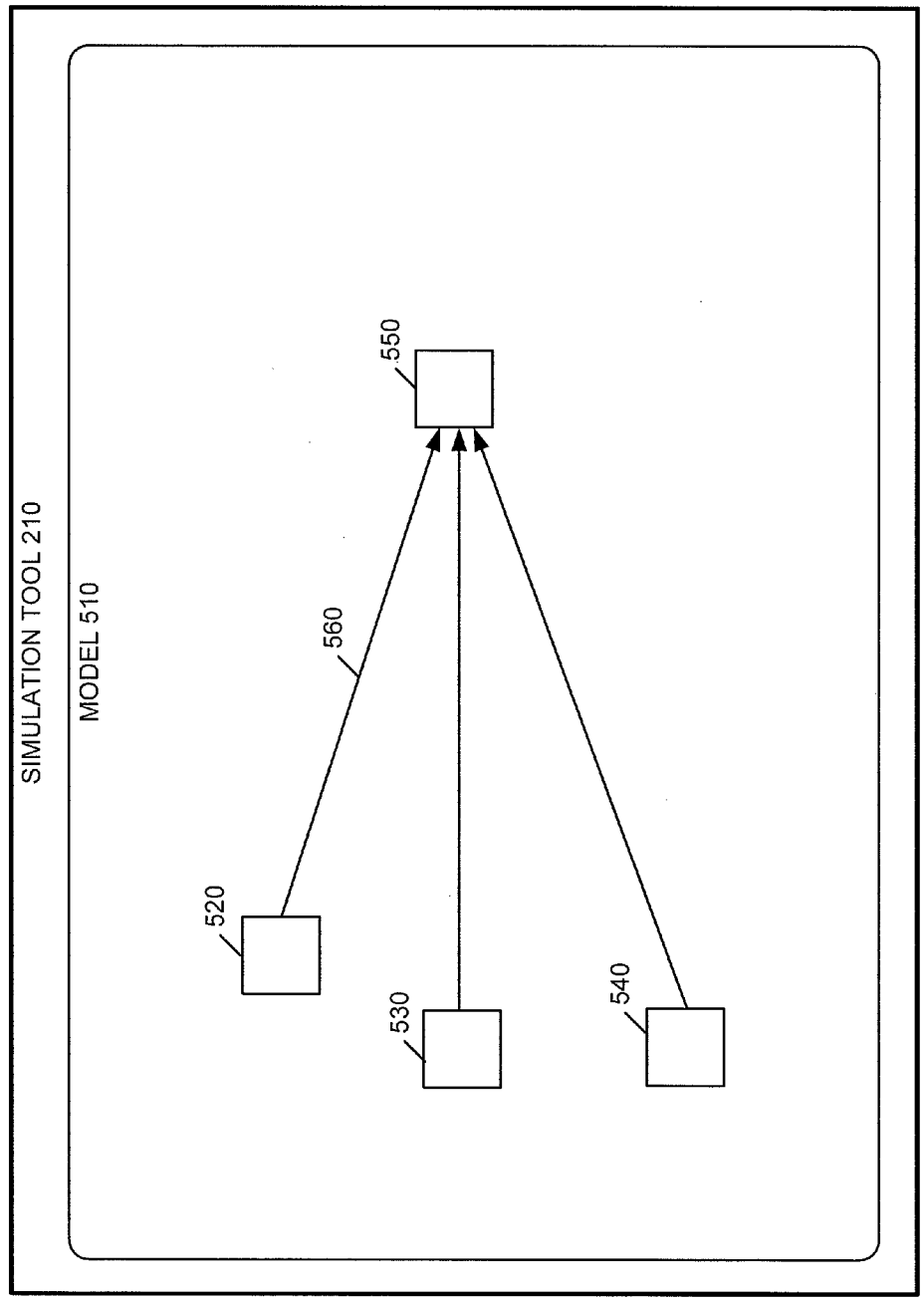

Target Scheduling Definition GUI
                                                                        890

- Task Scheduling Mechanism: (pulldown)
    - Bare - board interrupt based
        - Nested interrupts supported: yes/no
    - RTOS: Priority based task scheduling
        - Task preemption allowed:Yes/no
            - Preemption relationship (pulldown)
                - High to low priority only, same priority tasks do not preempt each other
                - High to low priority where same priority tasks are can preempt each other (round-robin timeslicing)
                - Scheduler based timeslicing between tasks of same and different priorities
    - RTOS: Nearest deadline first task scheduling
- Parallel task execution supported (e.g.multicore): Yes/no
    - Tasks statically assigned to a core: Yes/no
        - Number of cores: 4
        - Task assignment

| Core 1 | Core 2 | Core 3 | Core 4 |
|--------|--------|--------|--------|
| Task 1,2 | Task 4 | Task 3, 5 | Task 6 |

- Preferred data transfer mechanism: (pulldown):
    - ANSI/ISO C atomic 'char' read/write control flag and data buffering
    - Custom critical section control mechanism (mutual exclusion semphore, Interrupt enable/disable):
        - Code generation file: example-critical-section.tlc
    - Custom control and data transfer:
        - Code generation file: example-critical-section-and-data-xfer.tlc
- Allow task scheduling overruns: Yes/no
    - Allow only during startup: yes/no
    - Queue overrun events for later scheduling: yes/no
        - Number of overruns to allow for a task: 2

Analyze computational throughput

- Tooltip: Click button to run test model using Processor-In-the-Loop to determine execution speed of representative algorithms
- Latest Results (used for recommendations in the Schedulability report):

| Alg1 | Alg2 | Alg3 | Alg4 |
|------|------|------|------|
| 52.1 msec | 213 msec | 124 msec | 435 msec |

FIG. 8C

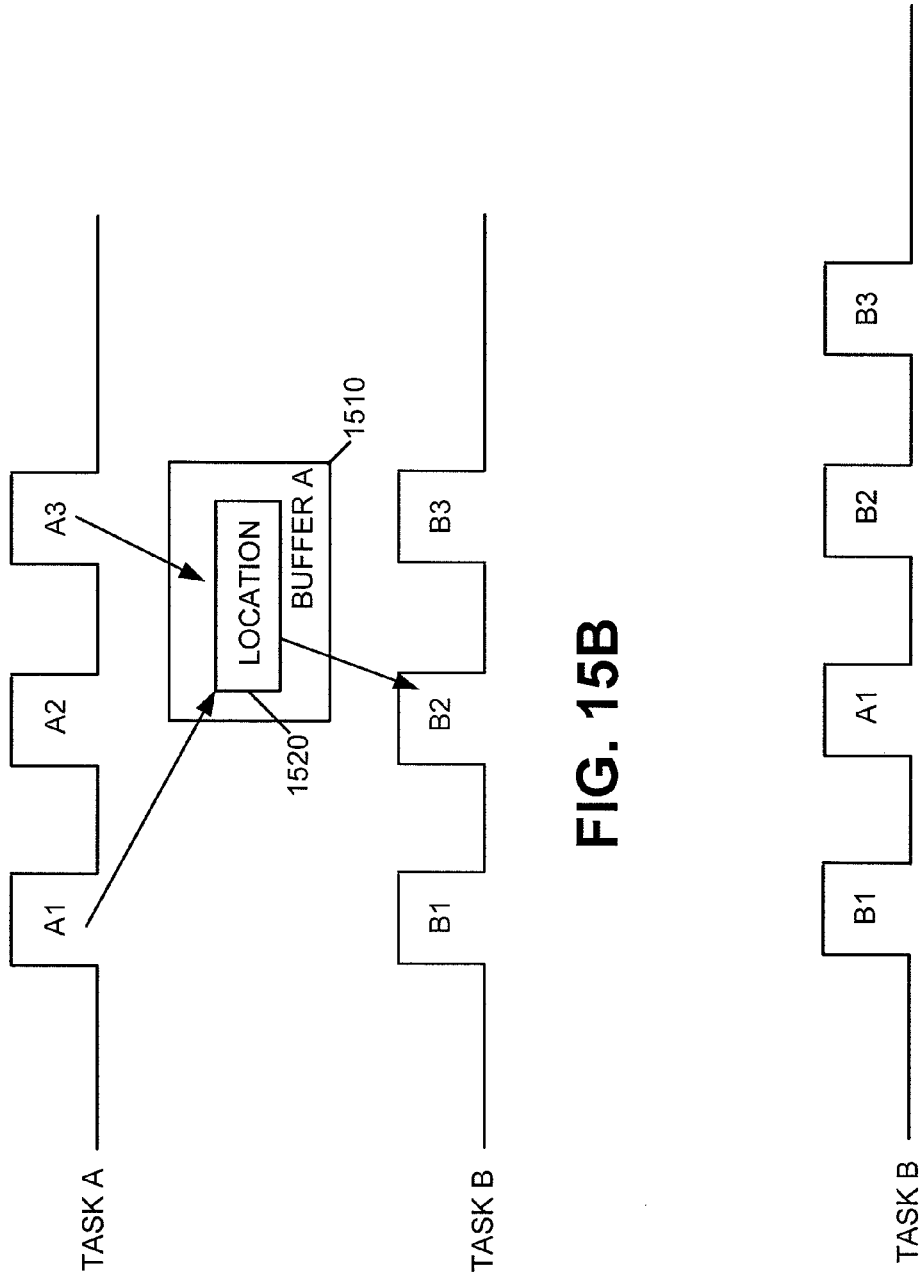

```
// block 520A
x = a * 0.3;

// block 530A
if (b < 10) {
    y = 1.1 + sin(b);
} else {
    y = 2.1 + cos(b);
}

// block 540A
double z = 0;
for (i=0; i < 10; i++) {
    z = a + 1.3*z
}

// block 550A
k = z * 0.2 * (y / x;)
```

FIG. 17

| Block | DependsOn | Provides | Median Time |
|-------|-----------|----------|-------------|
| 540A  | a         | z        | 16.2        |
| 530A  | b         | y        | 9.1         |
| 520A  | a         | x        | 2.3         |
| 550A  | z,y,x     | k        | 7.4         |

SCHEDULING GENERATED CODE BASED ON TARGET CHARACTERISTICS

RELATED APPLICATIONS

The instant application is a continuation-in-part application of co-pending U.S. patent application Ser. No. 12/540,960 filed Aug. 13, 2009, the contents of which are incorporated herein in their entirety.

BACKGROUND INFORMATION

Graphical models may be used to simulate types of physical systems, such as discrete systems, event-based systems, time-based systems, state-based systems, data flow-based systems, etc. These models may include components, such as blocks, that reference executable code for performing operations when the graphical model is executing. The blocks can vary in type and/or number and may be connected together to build large, complex models (e.g., models including hundreds or more interconnected blocks).

At times, it may be desirable to implement code from some or all of a graphical model on a target platform once a model has been designed. For example, a user may develop a graphical model on a workstation. When the model is complete, the user may wish to execute the model on a target device that includes a real-time operating system. In this example, the model may need to execute within a determined time interval on the target so that the target can perform processing operations in real-time (e.g., processing data from a running system without falling behind over time).

The user may need to perform trial and error guesses regarding how to schedule various components of the model for real-time execution on the target. For example, the target may utilize two processors to perform real-time processing. The user may need to allocate a portion of the model components to execute on one processor and another portion of the components to execute on the other processor. If the target cannot operate in real-time with this configuration, the user may need to reallocate the components in a different way and then determine whether the new configuration will execute in real-time on the target.

In some instances the user may spend significant time attempting different configurations in order to arrive at a schedule configuration amenable to real-time execution on the target. In some instances, such as when a model contains many components, the user may be unable to identify a schedule configuration for the model components that allows for real-time execution on the target. This last situation may frequently occur when, for example, some model components rely on other model components for data, or where model components have differing operating priorities in the model.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIGS. 3A and 3B illustrate an exemplary implementation of single-tasking scheduling for code segments;

FIGS. 5A and 5B illustrate views for an exemplary model that includes blocks having scheduling relationships therebetween;

FIGS. 8A-8C illustrate exemplary user interfaces that can be used with exemplary embodiments;

FIGS. 15A-D illustrate an exemplary embodiment that manipulates code execution to satisfy a schedulability goal;

FIG. 17 illustrates exemplary pseudo code for the model of FIG. 5B;

FIG. 19 illustrates an exemplary dependency table;

DETAILED DESCRIPTION

Figure 1:
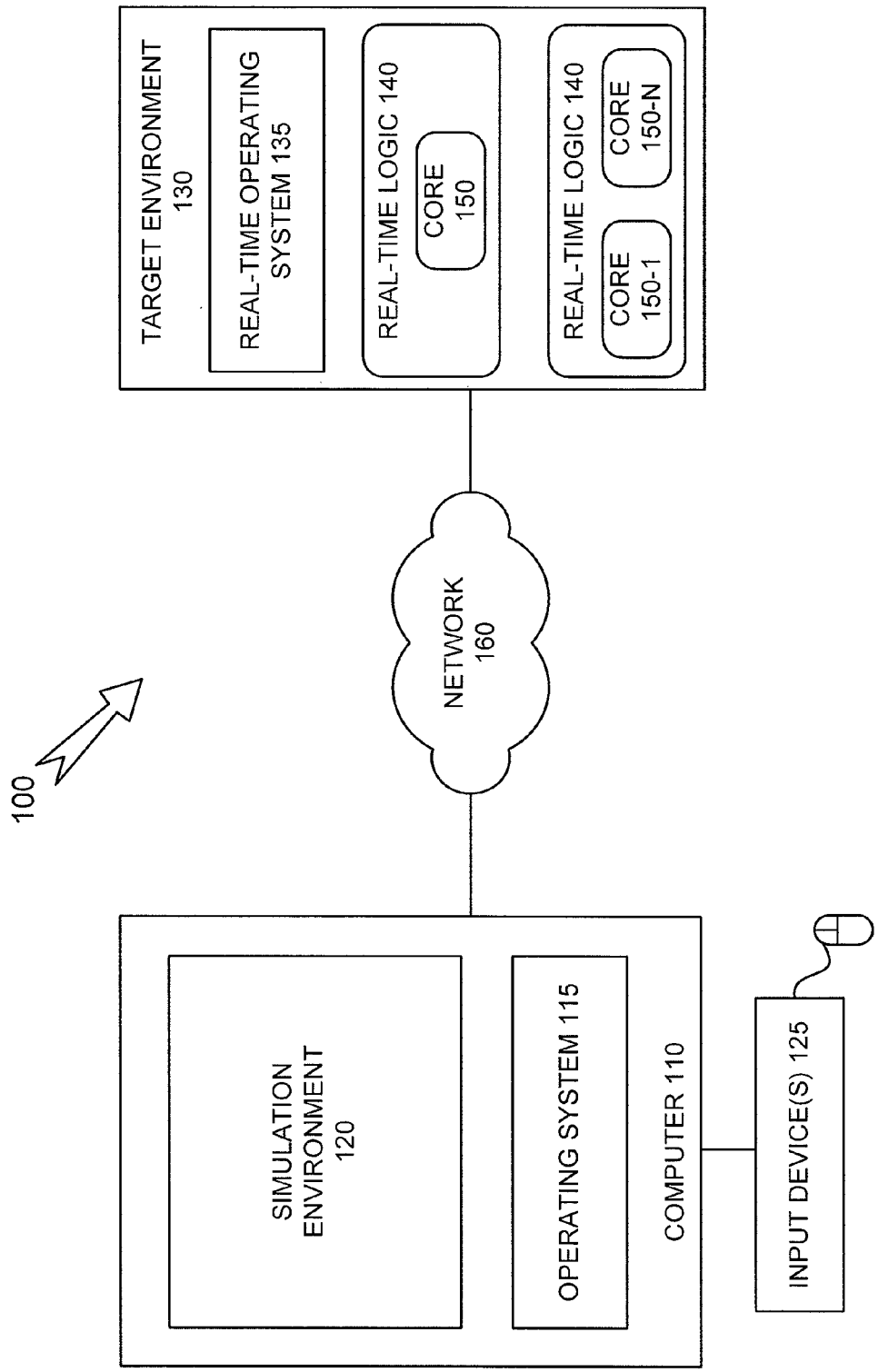
FIG. 1 illustrates an exemplary system for practicing an embodiment.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Overview

Executable graphical models may be deployed to a target in order to have the target perform certain operations. At times, it may be desirable to have the target perform operations according to certain constraints, such as a real-time execution constraint. Real-time may refer to a requirement for speed of execution or a response to an external event. For example, a real-time processor may need to execute code within a determined time interval, where the interval identifies a boundary of what is considered real-time. Alternatively, a real-time processor may need to process an input signal within the determined interval that identifies the real-time boundary. If the real-time processor cannot process code or respond to an event within the determined interval, the processor may be considered to no longer be processing in real-time (e.g., when the processor fails to execute code within the real-time interval or within a memory usage constraint, which may cause processing results to become progressively more delayed as the processor continues to operate).

In many applications, the target will include two or more types of processing logic for performing real-time processing. For example, processing logic on the target may include two or more processors, field programmable gate arrays (FPGAs), application specific integrated circuits (ASICs), application specific instruction-set processors (ASIPs), digital signal processors (DSPs), graphics processor units (GPUs), programmable logic devices (PLDs), etc. Alternatively, the target may include a single processor that includes two or more types of logic, such as cores. The target may further use one or more threads, processes, or tasks with processing logic to perform real-time processing.

When a user wishes to run a model on the target, the number and types of processing logic on the target may be taken into account. In addition, other characteristics of the target may need to be accounted for, such as memory size/type, clock rates, bus speeds, network connections, operating system type, etc. Other characteristics that can be taken into account include, but are not limited to, whether the target supports execution priorities, single-tasking execution, multi-tasking execution, preemption, time slicing, concurrency, etc. When a model is transformed into a format for real-time execution on the target, such as by generating executable code from the model, components in the model may need to be scheduled for execution on types of processing logic in the target. For example, code for model components may be temporally related to each other and scheduling the code for the components may need to account for this relationship to satisfy a real-time constraint.

Exemplary embodiments account for target characteristics when generating code from a graphical model. For example, an embodiment may receive information about target characteristics from the target via a link. The embodiment may use the information to determine whether a schedule received from a user will allow a graphical model, or parts of the model, to execute in real-time on the target. The embodiment may allow the user to select a different schedule or may provide the user with a programmatically generated schedule that will support real-time execution on the target. In this example, the user is provided with feedback about an execution schedule without having to generate code from the model and without having to execute the generated code on the target to determine whether the code will execute in real-time.

Exemplary embodiments can further optimize generated code based on target characteristics to ensure that generated code executes in real-time on the target. Exemplary embodiments can also provide a user with interactive reports that allow the user to enter selections regarding target characteristics, model components, simulation environments, etc. Exemplary embodiments can further be used in local configurations (e.g., where target hardware is plugged into a device that performs modeling and code generation) or remote configurations where one or more targets are remote with respect to a device that performs modeling and code generation. Exemplary embodiments can further be used with multiple target environments that operate collectively in a computing grid or other arrangement to perform parallel real-time processing.

Exemplary System

FIG. 1 illustrates an exemplary system 100 for practicing an embodiment. For example, system 100 may be used to construct a model that includes one or more components and to generate code for the model based on target characteristics received from a target environment. For example, an embodiment can receive target characteristics directly from the target environment, or indirectly from the target environment (e.g., from another device on behalf of the target environment). System 100 may include computer 110, target environment 130 and network 160. The system in FIG. 1 is illustrative and other embodiments of system 100 can include fewer devices, more devices, and/or devices in configurations that differ from the configuration of FIG. 1.

Computer 110 may include a device that performs processing operations, display operations, communication operations, etc. For example, computer 110 may include logic, such as one or more processing or storage, devices that can be used to perform and/or support processing activities on behalf of a user. Embodiments of computer 110 may include a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or to generate one or more results.

Computer 110 may further perform communication operations by sending data to or receiving data from another device, such as target environment 130. Data may refer to any type of machine-readable information having substantially any format that may be adapted for use in one or more networks and/or with one or more devices. Data may include digital information or analog information. Data may further be packetized and/or non-packetized.

Computer 110 may include operating system 115, simulation environment 120, and input device 125. Operating system 115 may include logic that manages hardware and/or software resources associated with computer 110. For example, operating system 115 may manage tasks associated with receiving user inputs, operating computing environment 110, allocating memory, prioritizing system requests, etc. In an embodiment, operating system 115 may be a virtual operating system. Embodiments of operating system 115 may include Linux, Mac OS, Microsoft Windows, Solaris, UNIX, etc. Operating system 115 may further support virtualization.

Simulation environment 120 includes logic that provides a computing environment that allows users to perform simulation or modeling tasks related to disciplines, such as, but not limited to, mathematics, science, engineering, medicine, business, etc. Simulation environment 120 may support one or more applications that execute instructions to allow a user to construct an executable model and to execute the model to produce a result. Simulation environment 120 may be configured to receive target characteristics from target environment 130 and may generate code from a model based on the target characteristics. Simulation environment 120 may send generated code to target environment 130 via network 160 so that target environment 130 can execute the code to produce a result. While the embodiment of FIG. 1 includes a simulation environment 120, other embodiments may be implemented without a simulation environment.

Input device 125 may include logic to receive user inputs. For example, input device 125 may transform a user motion or action into a signal or message that can be interpreted by computer 110. Input device 125 can include, but is not limited to, keyboards, pointing devices, biometric devices, accelerometers, microphones, haptic devices, etc.

Target environment 130 may include logic that executes instructions to perform one or more operations. In an embodiment, target environment 130 can include processing logic adapted to execute generated code received from computer 110. In an embodiment, target environment 130 can include real-time logic for performing processing operations in real-time. For example, target environment 130 may include a real-time operating system and hardware that are configured to process received signals or events in real-time or to execute simulations in real-time.

In an embodiment, target environment 130 may include real-time operating system 135 (RT-O/S 135) and real-time logic 140 for performing real-time computing operations. RT-O/S 135 may include software that manages hardware and/or software resources associated with target environment 130. For example, RT O/S 135 may be a multitasking operating system that supports real-time operations in target environment 130. These real-time operations can include, but are not limited to, receiving information, such as executable code, from computer 110; controlling hardware that acquires real-time data, real-time processing of acquired data, buffering real-time data during processing, storing processed real-time data, displaying results of real-time processing, controlling actuator hardware, etc.

Real-time logic 140 may include hardware that supports real-time tasks in target environment 130. For example, real-time logic 140 may perform receiving, processing, buffering, storing, transmitting, etc., operations in target environment 130. For example, real-time logic 140 may include one or more specialized processing devices for processing real-time data, random access memories (RAMs) for storing processed real-time data, and communication mechanisms for transferring information between real-time logic 140 and RT-O/S 135. Embodiments of real-time logic 140 can include one or more cores 150, e.g., cores 150-1 to 150-N, for processing instructions associated with a real-time operation.

Network 160 may include a network that transfers data (e.g., packet data or non-packet data). Implementations of network 160 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.11, Worldwide Interoperability for Microwave Access (WiMax), Bluetooth, etc.

Network 160 may include network devices, such as routers, switches, firewalls, and/or servers (not shown). Network 160 may be a hardwired network using wired conductors and/or optical fibers and/or may be a wireless network using free-space optical, radio frequency (RF), and/or acoustic transmission paths. In one implementation, network 160 may be a substantially open public network, such as the Internet. In another implementation, network 160 may be a more restricted network, such as a corporate virtual network. Implementations of networks and/or devices operating on networks described herein are not limited to any particular data type, protocol, architecture, configuration, etc.

Exemplary Simulation Environment

Figure 2:
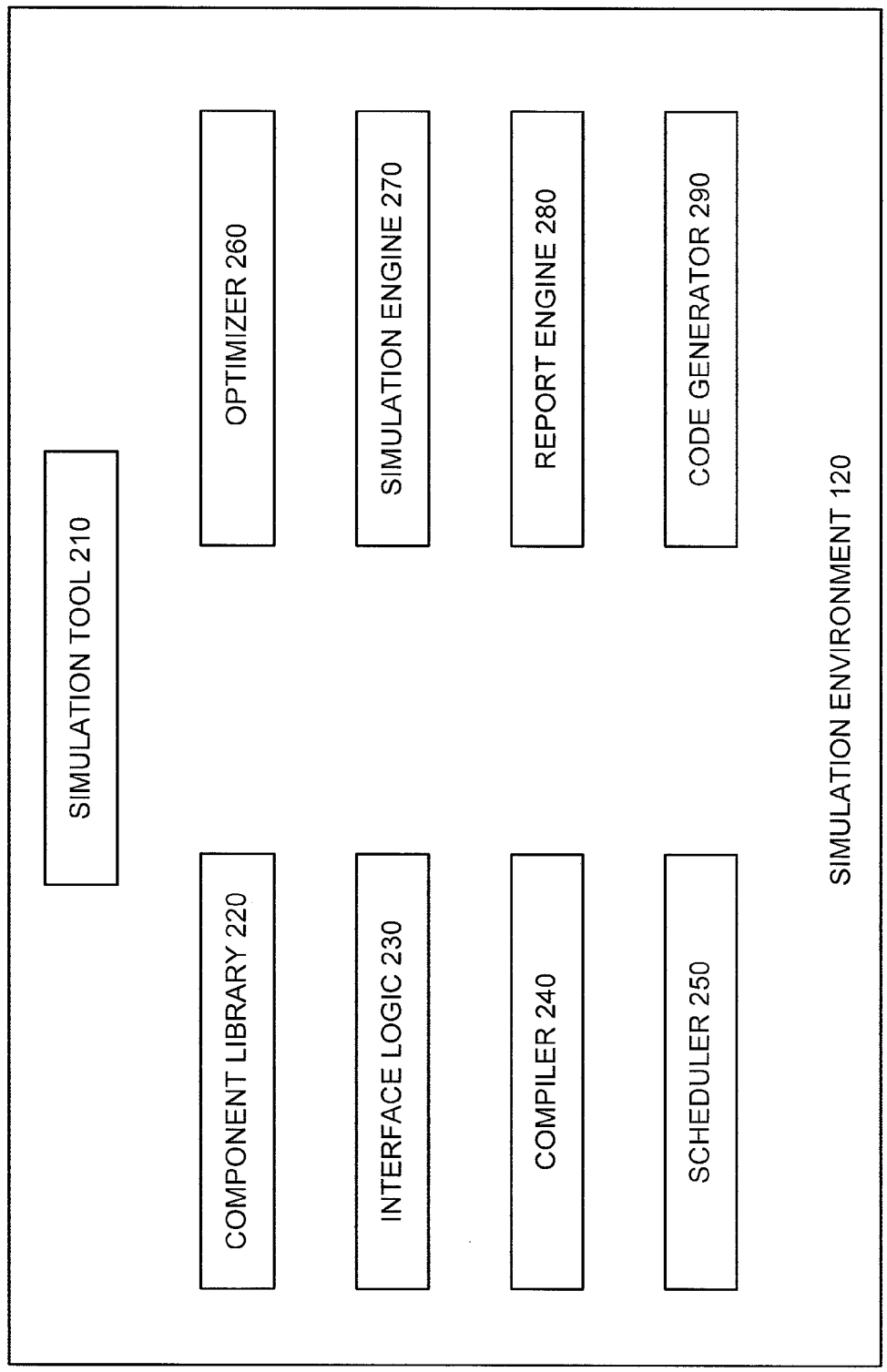
FIG. 2 illustrates an exemplary embodiment of a simulation environment.

FIG. 2 illustrates an exemplary embodiment of a simulation environment 120. Simulation environment 120 can include simulation tool 210, component library 220, interface logic 230, compiler 240, scheduler 250, optimizer 260, simulation engine 270, report engine 280, and code generator 290. The embodiment of simulation environment 120 illustrated in FIG. 2 is illustrative and other embodiments of simulation environment 120 can include more entities or fewer entities without departing from the spirit of the invention.

Simulation tool 210 may be an application for building an executable model, such as a graphical model. Simulation tool 210 may allow users to create, modify, diagnose, delete, etc., model components and/or connections. Simulation tool 210 may interact with other entities illustrated in FIG. 1 or 2 for receiving user inputs, executing a model, displaying results, interacting with target characteristics, etc.

Component library 220 may include components, e.g., blocks/icons, and/or connections (e.g., lines) that a user can drag and drop into a display window representing a graphical model. The user may further connect components using connections to produce an executable graphical model.

Interface logic 230 may allow simulation environment 120 to send or receive data and/or information to/from devices (e.g., target environment 130) or software modules (e.g., an application program interface). Compiler 240 may compile a model into an executable format. In an embodiment, compiler 240 may provide a user with debugging capabilities for diagnosing errors associated with the model. Compiled code produced by compiler 240 may be executed on computer 110 to produce a modeling result.

Scheduler 250 may schedule execution of model components on various types of processing logic, such as a microprocessor, a core, an FPGA, an ASIC, etc. Embodiments of scheduler 250 may implement substantially any type of scheduling technique, such as single-rate scheduling, multi-rate scheduling, round-robin scheduling, time-slicing scheduling, preemption, etc. In an embodiment, scheduler 250 may use target characteristics to determine how to schedule components in a model for execution on computer 110 and/or target environment 130. For example, scheduler 250 may schedule model components to be distributed and executed on certain real-time processors, or cores, so that the model components execute within a determined time interval (e.g., a real-time execution interval). In an embodiment, scheduler 250 can include an analysis engine for evaluating model components to determine scheduling information related to the components.

Optimizer 260 may optimize code for a model based on a parameter. For example, optimizer 260 may optimize code to cause the code to occupy less memory, to cause the code to execute more efficiently, to cause the code to execute faster, etc., than the code would if the code were not optimized. In an embodiment, optimizer 260 may operate with or may be integrated into compiler 240, scheduler 250, code generator 290, etc.

Simulation engine 270 may execute code for a model to simulate a system. For example, simulation engine 270 may receive compiled code from compiler 240 and may execute the code to produce a modeling result. Simulation engine 270 may be configured to perform standalone or remote simulations based on user preferences or system preferences.

Report engine 280 may produce a report based on information in simulation environment 120. For example, a user may build a model and then may desire to generate code from the model, where the generated code will execute on target environment 130. Report engine 280 may display an interactive report to the user that shows the user available real-time logic 140 along with model components that will execute on respective ones of the real-time logic. The user may select certain blocks to run on a first core 150-1 of real-time logic 150 and the remainder of the blocks to run on a second core 150-N. Once the user has made selections, simulation environment 120 may perform simulation and/or scheduling operations to determine whether the configuration input by the user will execute within a determined time interval (e.g., a real-time interval on target environment 130). Embodiments of report engine 280 can also produce reports in a hardcopy format or a format adapted for storage in a storage device.

Code generator 290 can generate code from a model. In an embodiment, code generator 290 may receive code in a first format and may transform the code from the first format into a second format. In an embodiment, code generator 290 can generate source code, assembly language code, binary code, interface information, configuration information, performance information, etc., from at least a portion of a graphical model.

For example, code generator 290 can generate C, C++, SystemC, Java, etc., from the graphical model. Embodiments of code generator 290 can further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Hardware Description Language (HDL), Automotive Open System Architecture (AUTOSAR), etc.).

Exemplary Scheduling Modes

Scheduler 250 may support a number of scheduling methodologies that can be implemented on one or more types of processing logic. For example, scheduler 250 can support single-tasking or multi-tasking scheduling modes.

FIGS. 3A and 3B illustrate an exemplary implementation of single-tasking scheduling for code segments. Code for a model may be made up of units, such as segments, that collectively make up the model. For example, one code segment may implement a first block, function, etc., and a second code segment may implement a second block, function, etc. These code segments may be related to each other, e.g., in time (temporally), and may execute according to a simulation schedule when the model is executed.

Referring to FIG. 3A, code making up a model may include 1 millisecond (ms) segment 310, 2 ms segment 320, and 4 ms segment 330. In FIG. 3A, 1ms segment 310 may execute every 1 ms, 2 ms segment 320 may execute every 2 ms, and 4 ms segment 330 may execute every 4 ms when a model that includes segments 310, 320 and 330 executes properly, e.g., executes within a determined time interval. In the single-tasking implementation of FIG. 3A, the sampling interval 340 of the model is 1ms. Therefore, each segment of code needs to start and stop executing within 1ms for a model to execute properly.

In FIG. 3A, segment 310, 320 and 330 each execute between $t_0$ and $t_1$. Then segment 310 executes again at $t_1$, $t_2$, $t_3$, $t_4$ and $t_5$ since this code segment executes every 1ms. During the interval $t_2$-$t_3$, segment 320 executes since this code segment executes every 2 ms. During the interval $t_3$-$t_4$, only segment 310 executes. And, during the interval $t_4$-$t_5$, segments 310, 320 and 330 execute. In FIG. 3A, the model executes as desired since segments 310, 320, and 330 all execute within a 1 ms sampling interval 340.

In contrast to FIG. 3A, FIG. 3B illustrates a situation in which the model does not execute as desired because one or more code segments 310, 320 and 330 do not finish executing within interval 340. For example, at $t_1$, code segment 330 did not finish executing during interval $t_0$-$t_1$. Execution of code segment 330 can be said to have overrun interval $t_0$-$t_1$, spilling over into interval $t_1$-$t_2$.

In FIG. 3B, an overrun occurs at t5 when code segment 320 does not finish executing during interval $t_4$-$t_5$. Since overruns occur in FIG. 3B, the model does not execute as desired. If the model of FIGS. 3A and 3B were designed to run in real-time, the implementation of FIG. 3A may satisfy the real-time constraint for the model. However, the implementation of FIG. 3B would not satisfy the real-time constraint since overruns occur during execution. In FIG. 3B the model may crash, issue an error, or may fall further and further behind in time as the model continues to execute. Alternatively, the model may initially fall behind real time, but may catch up during intervals when less code is executed. These temporary overruns may result in soft real-time behavior, and this may be allowed in certain applications.

Models may also use multi-tasking scheduling modes for execution. In situations where multi-tasking is used, a user may find it more difficult to determine how to schedule code segments since techniques, such as preemption, can be used to interrupt execution of certain code segments in order to let other code segments execute. For example, code segments may have execution priorities associated with them. A low priority code segment may be executing and its execution may not end before the beginning of a next sampling interval. Instead of overrunning into the next sampling interval, as might happen in single-tasking scheduling, the low priority code segment may be paused, or preempted, to allow a higher priority code segment to execute. When the higher priority code segment has executed, the low priority code segment may finish executing.

Figure 4:
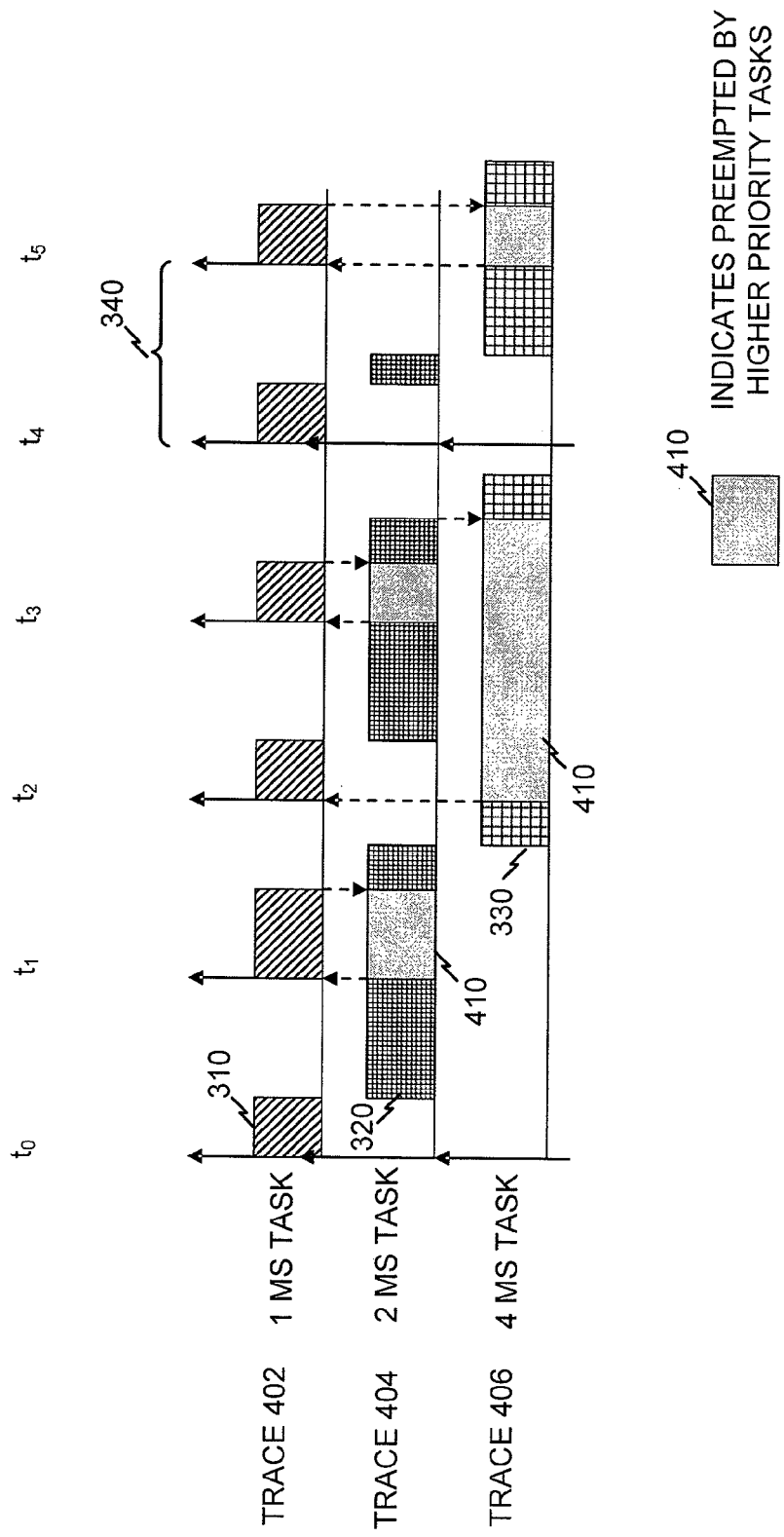
FIG. 4 illustrates an exemplary implementation of multi-tasking scheduling for code segments.

FIG. 4 illustrates an exemplary implementation of multi-tasking scheduling for code segments. FIG. 4 utilizes segments 310, 320, and 330 from FIGS. 3A and 3B and further utilizes a sampling interval of 1ms. In FIG. 4, code segment 310 may have a priority that is higher than a priority of code segment 320, and code segment 320 may be of a higher priority than a priority of code segment 330.

Referring to FIG. 4, 1ms segment 310 may start executing at $t_0$ (as shown on trace 402) and 2 ms segment 320 may begin executing after $t_0$ but during the interval $t_0$-$t_1$ (as shown on trace 404). Segment 320 may not finish executing before time $t_1$. Since segment 320 has a priority that is lower than a priority of segment 310, execution of segment 320 may be preempted at $t_1$ so that segment 310 can execute a second time. When segment 310 finishes executing during the interval $t_1$-$t_2$, segment 320 resumes executing.

During interval $t_1$-$t_2$, code segment 330 may begin executing (as shown on trace 406). At $t_2$, execution of segment 330 may be preempted so that segment 310 can execute and so that segment 320 can begin executing during interval $t_2$-$t_3$. Segment 330 may resume executing once higher priority segments have finished executing, such as segments 310 and 320.

Exemplary Model

Figure 5B:
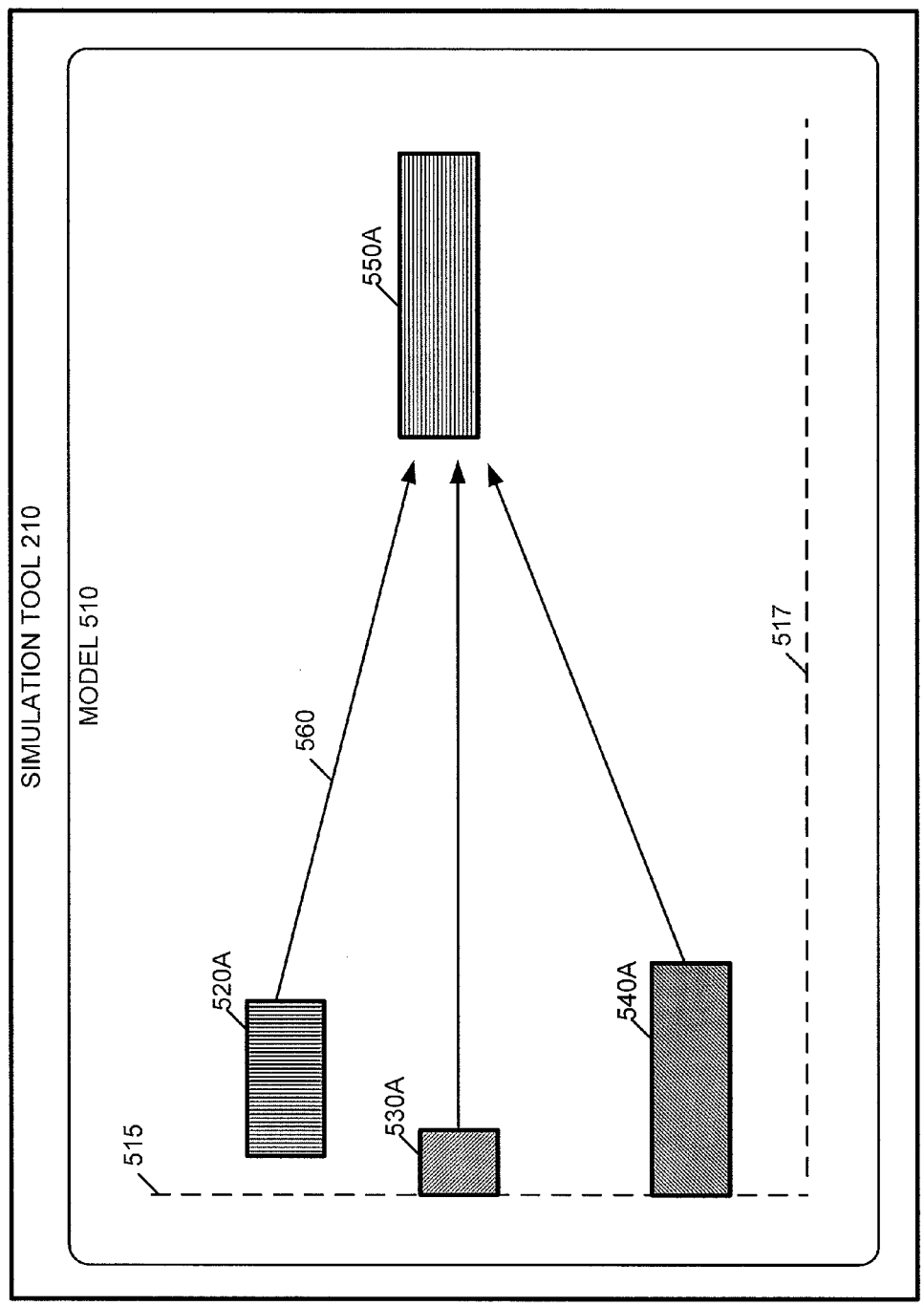

FIGS. 5A and 5B illustrate views for an exemplary model that includes blocks having relationships therebetween. These relationships may contain a scheduling aspect. Exemplary embodiments may display information to a user via a graphical user interface, such as graphical model 510 (hereinafter model 510). In an embodiment, model 510 may be implemented using simulation tool 210. Information can be displayed using a variety of techniques without departing from the spirit of the invention. For example, as illustrated in FIG. 5A, model 510 may display blocks 520, 530, 540 and 550, where the blocks represent executable code segments. In addition, model 510 may represent connections between blocks using line 560. In an embodiment, line 560 may include directionality information, such as arrow heads, text, icons, etc., and in another embodiment, line 560 may not include directionality information. The line may represent for example, data shared between the blocks, invocation of a block or a code segment such as a function or method call, etc.

In an embodiment, such as that of FIG. 5A, blocks 520-550 may have the same or similar shapes. For example, all blocks may be represented using a square or rectangle where the all squares or rectangles are the same size and/or color. Embodiments of model 510 may also display blocks in a way where the size, shape, color, shading, etc., of a block is representative of characteristics of the block.

For example, referring to FIG. 5B, model 510 may represent blocks using visual characteristics that represent: a size or amount of code making up the block, an execution rate for the block (e.g., once every 1ms, 2 ms, etc.), an execution time (e.g., a number of milliseconds it should take to execute a block), etc. In FIG. 5B, the sizes of blocks 520A, 530A, 540A, and 550A may represent the amount of time that it takes a respective block to execute. In an embodiment, the time it takes for a respective block to execute can be an estimated time, a computed time, a profiled time, etc. In addition, the times may be representative of best case execution times, worst case execution times, average execution times, median execution times, worst case response times, best case response times, etc. For example, block 520A may take longer to execute than block 530A because, for example, block 520A is longer (wider) than block 530A. Fill patterns or any other graphical representation such as, for example, color, of blocks in FIG. 5B may also be used to convey information about characteristics of blocks, such as information about a priority of a block, execution time for a block, data dependencies associated with a block, etc.

Line 560 may represent connections between blocks and may show information about data flows and/or dependencies (e.g., an arrowhead may indicate a direction of data flow and may indicate that block 550A takes as input data from blocks 520A, 530A, and 540A and may derive a data and/or an execution dependency from that). In FIG. 5B, the location of blocks within model 510 may convey information such as when a block executes relative to a time reference and/or to execution of another block. For example, reference line 517 may represent a time axis and reference line 515 may indicate execution priorities of blocks making up model 510. Lines, such as line 560, may also be used to convey time information in model 510. For example, line 560 may connect to block 550A at a point somewhere along the top edge of the rectangle of block 550A. The location of the connection may indicate when, during model execution, data is available for output or available for use as input.

A user of model 510 may desire to generate code from the model, such as generated code adapted to execute in target environment 130. Proper execution of the generated code may require that code segments included in the generated code execute according to a schedule.

By way of example, assume that target environment 130 is a real-time target that needs to respond to external events within a determined interval (e.g., within 1ms) in order to sustain real-time processing of the events. Maintaining real-time execution over time may require that code segments execute according to a real-time schedule (e.g., a real-time single-tasking schedule or multi-tasking schedule). Continuing with the example, target environment 130 may include concurrent resources such as real-time logic 140 having two cores, 150-1 and 150-2.

Figure 6A:
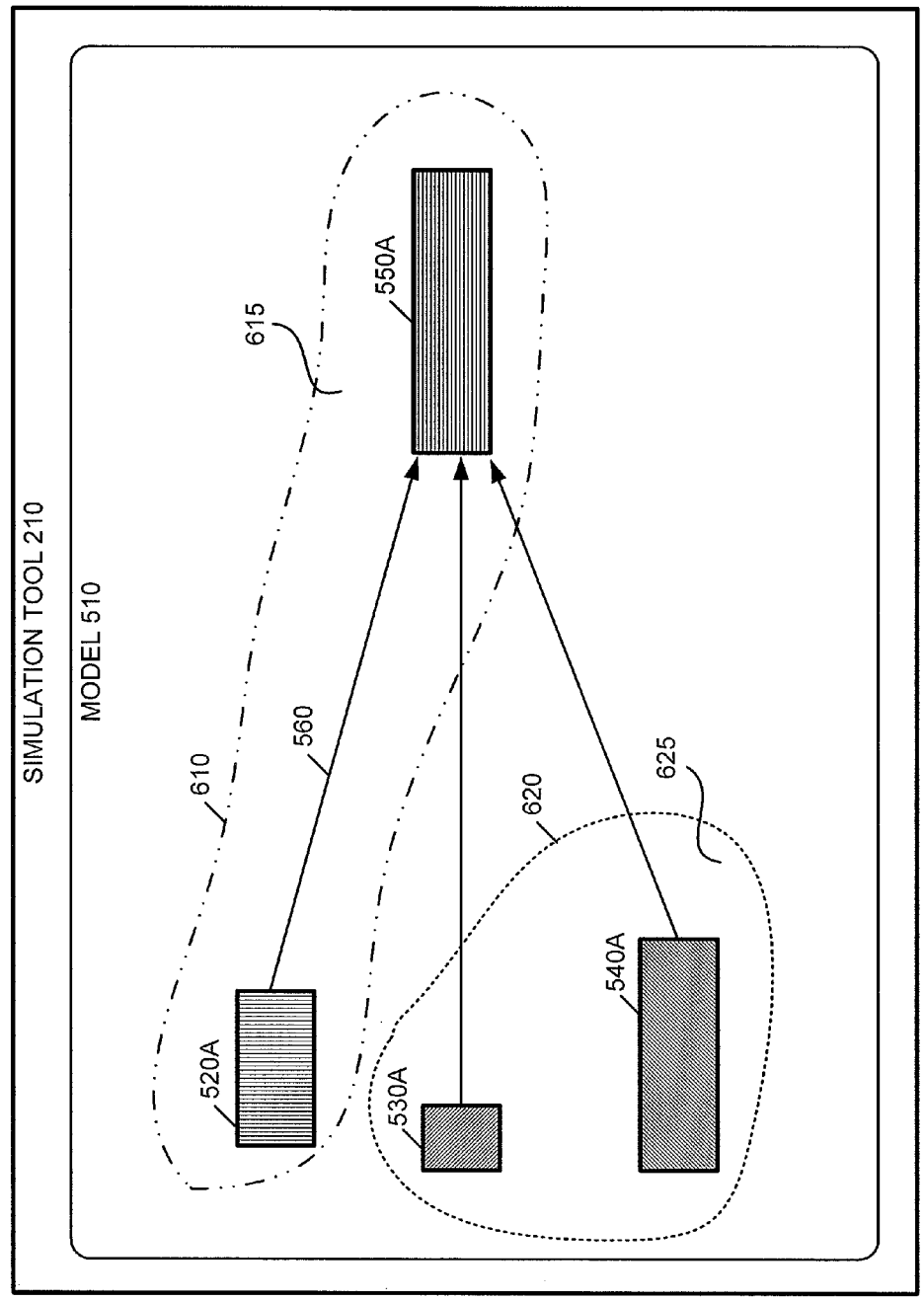
FIG. 6A illustrates a schedule for a model that executes on two cores.

Referring to FIG. 6A and continuing with the example, the user may assign a first subset of the blocks in model 510 into a first collection 615 for execution on core 150-1 and may assign a second subset of the blocks in model 510 into a second collection 625 for execution on core 150-2. In an embodiment, first collection 615 may be identified using a first border 610 and second collection 625 may be defined using a second border 620. Borders used with embodiments may use substantially any technique for identifying one or more executable graphical icons as belonging to a group (e.g., a line, a shape, shading, intermittent on/off display, audio signals, annotations, markers, tags, block parameters, etc.)

Still continuing with the example, generated code for target environment 130 may be configured according to the user's selection. Namely, generated code for blocks 520A and 550A may be configured to execute on core 150-1 and generated code for blocks 530A and 540A may be configured to execute on core 150-2. In an embodiment, the user may execute the generated code on target environment 130 to determine whether the generated code executes as desired, or simulation tool 210 may determine whether the schedule identified by the user (i.e., the schedule reflected in first collection 615 and second collection 625 of blocks) will execute as desired when implemented on target environment 130.

Still continuing with the example, the user may be provided with information that indicates that the schedule reflected in first collection 615 and second collection 625 will not execute fast enough to support real-time execution because of overruns, because of repeated overruns that violate soft real-time constraints, and/or unacceptable waiting times for core 150-1 and/or 150-2.

Figure 6B:
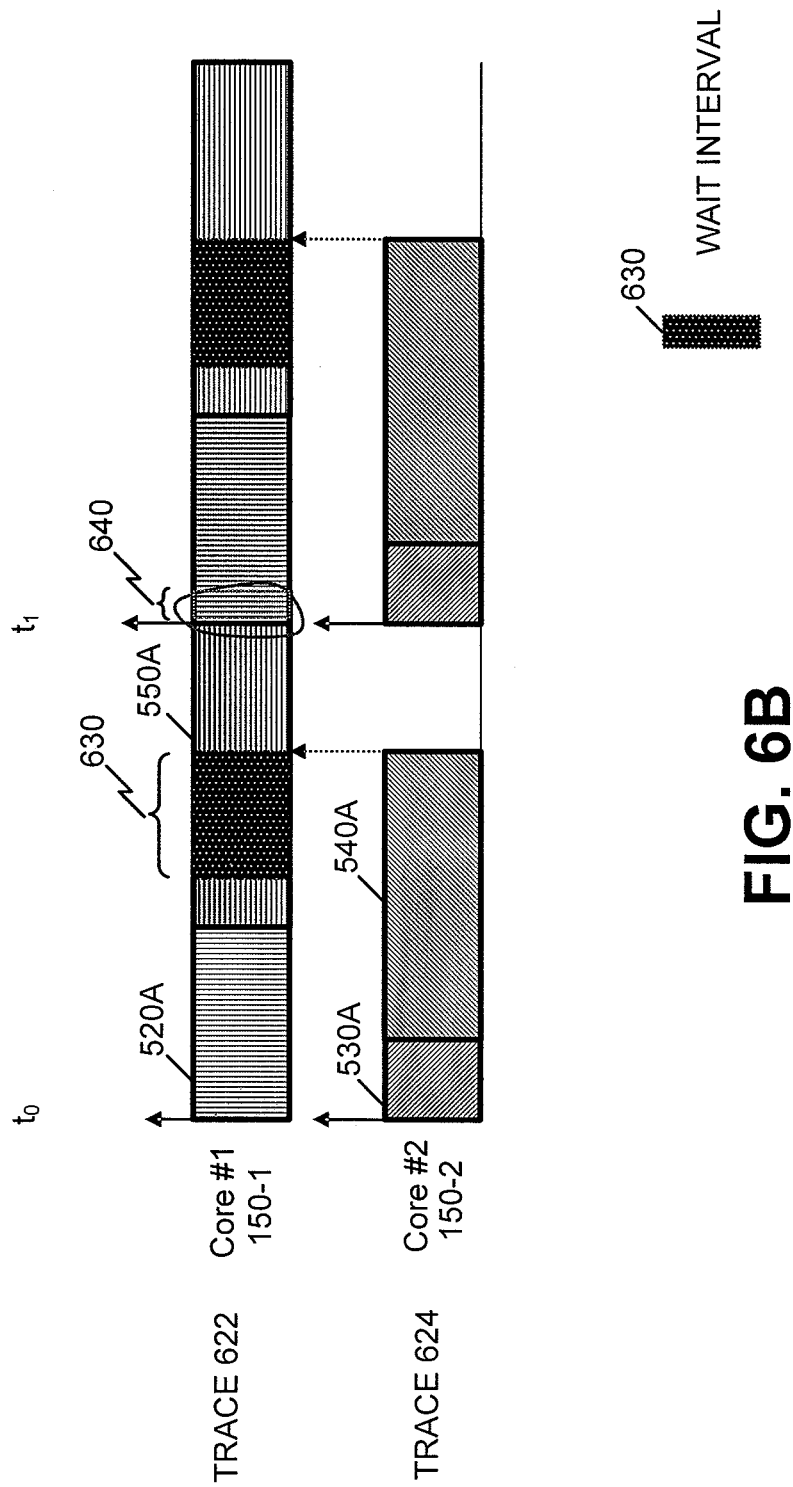
FIG. 6B illustrates a timing diagram for the model of FIG. 6A.

For example, referring to FIG. 6B, the user may be presented with a display that includes trace 622 and trace 624. Traces 622 and 624 may display information about segments of code that execute on core 150-1 or 150-2, respectively. Traces 622 and 624 may indicate that segment 520A executes during interval $t_0$-$t_1$ on core 150-1 and that segment 530A executes during $t_0$-$t_1$ on core 150-2. Traces 622/624 may also indicate that segment 550A begins to execute during interval $t_0$-$t_1$ but is paused or preempted during interval $t_0$-$t_1$ (as indicated by wait interval 630) so that segment 540A can finish executing. Segment 550A may need to wait for segment 540A to finish executing because segment 550A needs data from segment 540A to completely perform its processing activities. The failure of segment 550A to finish executing during interval $t_0$-$t_1$ may cause an overrun 640 during interval $t_1$-$t_2$. Overrun 640 may cause target environment 130 to produce processing results in non-real-time, i.e., target environment 130 may not generate results within a real-time interval in response to an external event.

Figure 7A:
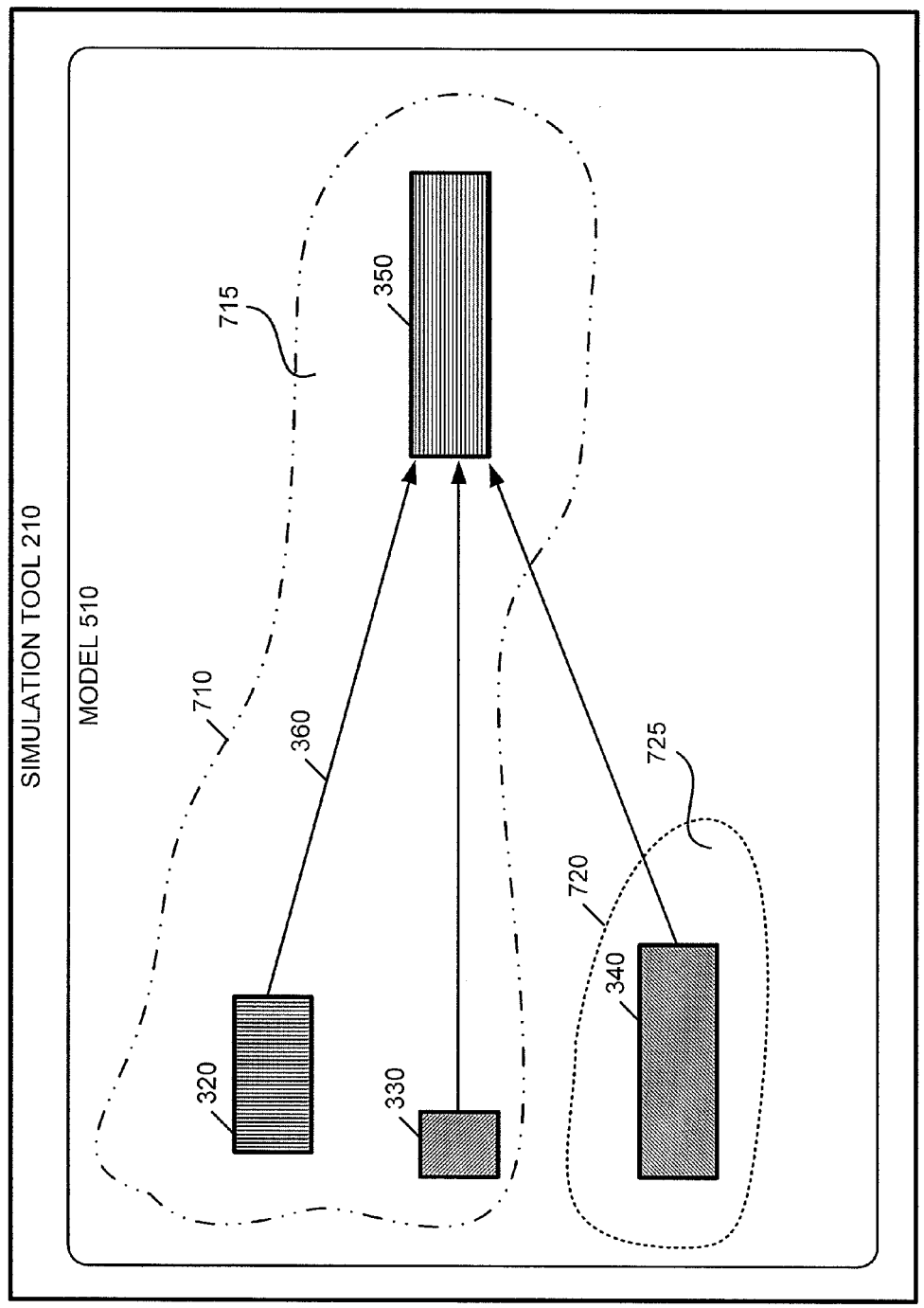
FIG. 7A illustrates an alternative schedule for the model of FIG. 6A.

Referring now to FIG. 7A, in an embodiment, the user may interact with model 510 and may re-group blocks of model 510 into an updated first collection 715 and an updated second collection 725. The updated collections 715, 725 may be identified, respectively, using updated border 710 and 720. In FIG. 7A, the updated collections 715, 725 may reflect updated schedules for blocks making up model 510 when code is generated for core 150-1 and 150-2. In another embodiment, computer 110 may programmatically determine collections 715 and 725 and may display borders 710 and 720 to identify the determined collections without requiring user inputs.

When the updated schedule is determined to be satisfactory, computer 110 may generate code for core 150-1 and 150-2 according to the updated collections 715 and 725. In an embodiment, the user may be presented with the display illustrated in FIG. 7B when the generated code is evaluated for operation on target environment 130 using the updated schedule. In an embodiment, the user may be presented with the display of FIG. 7B before any code is generated and/or executed on target environment 130.

Figure 7B:
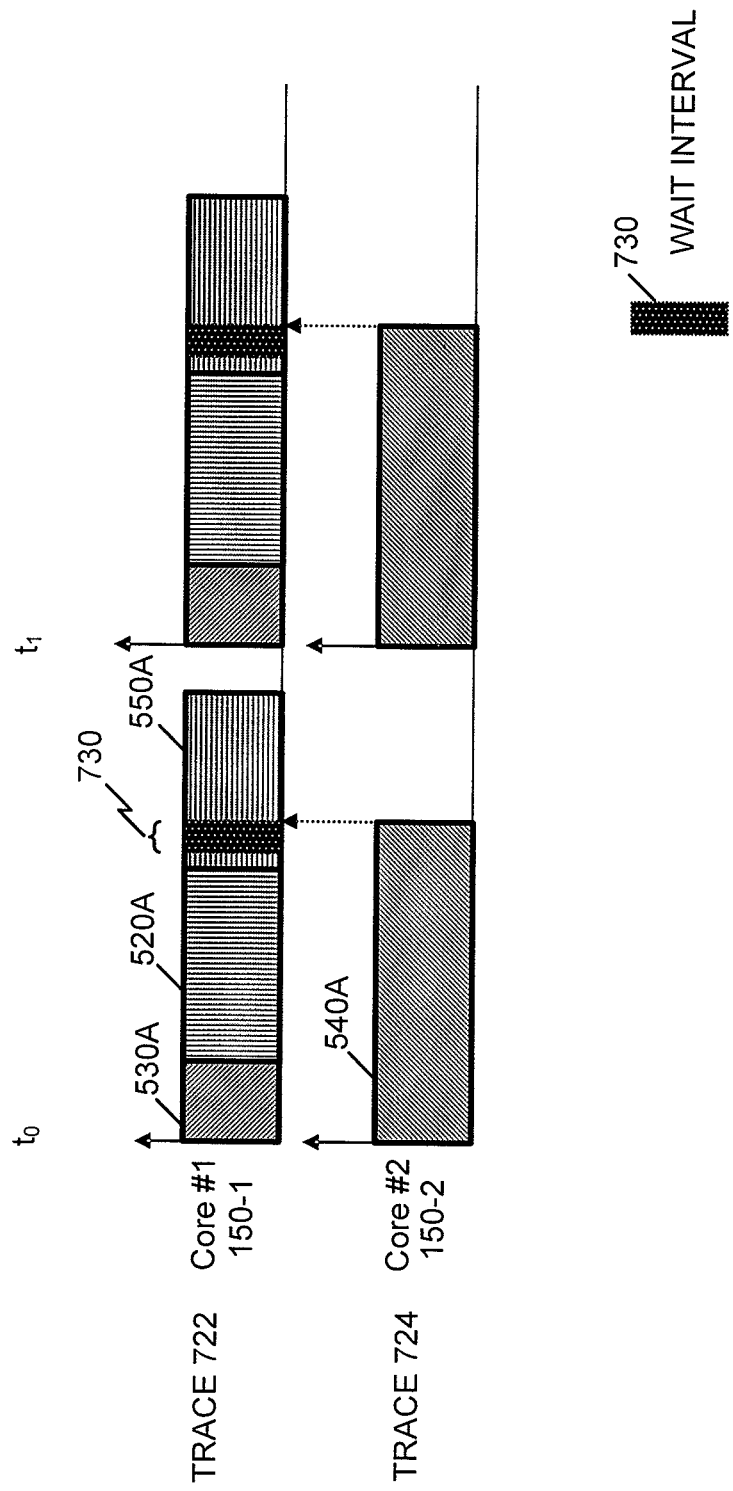
FIG. 7B illustrates a timing diagram for the model of FIG. 7A.

Referring to FIG. 7B, code segments may be scheduled on cores 150-1 and 150-2 based on an updated schedule that accounts for updated collections 715 and 725. The configuration illustrated in FIG. 7B reduces wait interval 730 on trace 722 as compared to wait interval 630 on trace 622 of FIG. 6B. In FIG. 7B, the reduced wait interval 730 helps eliminate overrun 640 of FIG. 6B. The configuration of FIG. 7B may allow target environment 130 to operate according to real-time constraints when processing external events using cores 150-1 and 150-2.

Figure 7C:
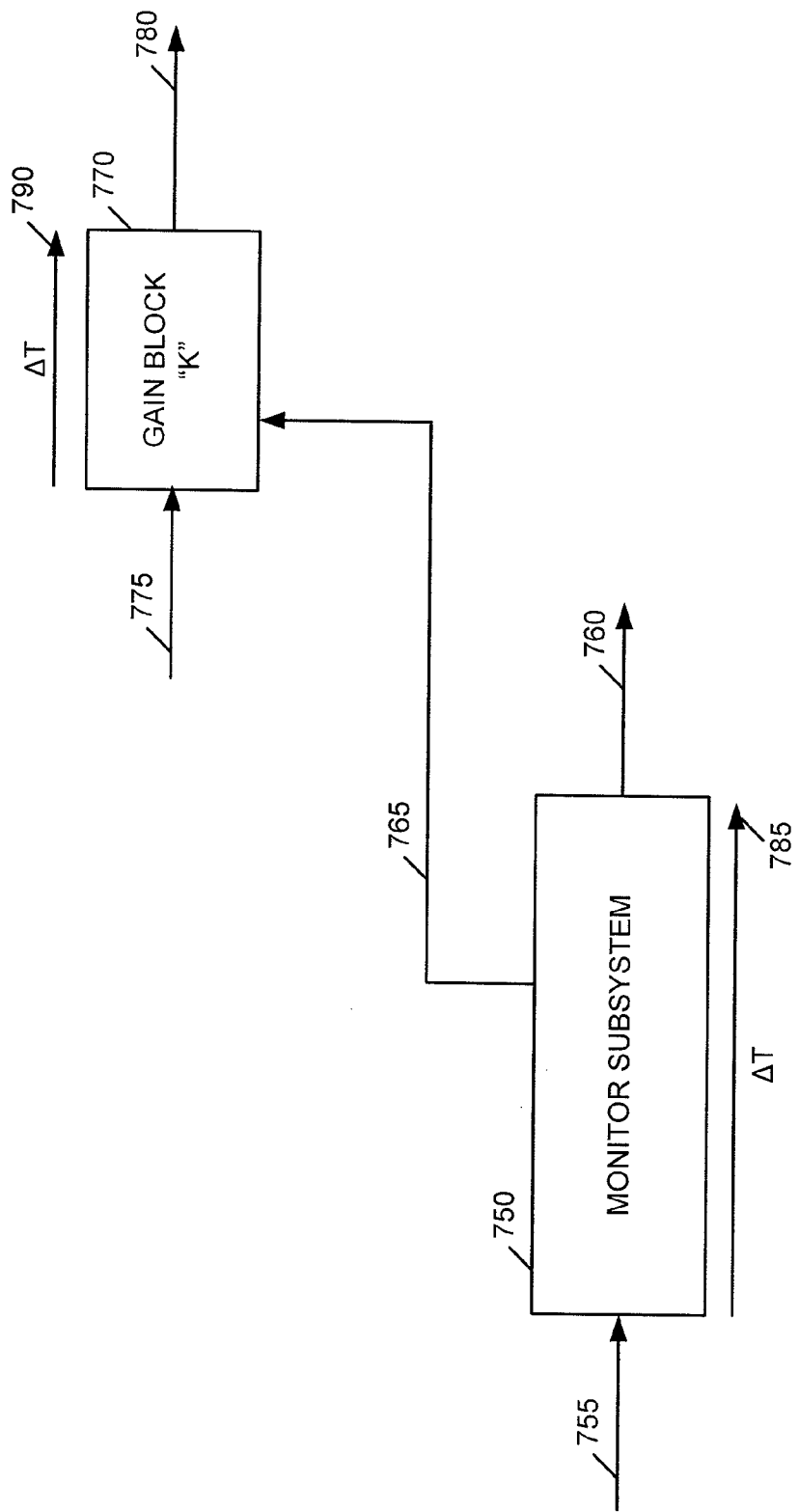
FIG. 7C illustrates an embodiment that includes aspects of FIGS. 7A and 7B.

Referring to FIG. 7C, an embodiment can be configured to display relationships between execution characteristics of code portions in a model. For example, a model can include a monitor subsystem 750 and a gain block 770. Subsystem 750 may receive an input signal 755 and may produce an interim output signal 765 and a final output signal 760. Gain block 770 may amplify an input signal by a constant K to produce an output signal 780. Gain block 770 may be configured to receive input signal 775 and interim output signal 765.

Subsystem 750 and gain block 770 may have respective execution times that can be identified using time axes 785 and 790, respectively. Moreover, sizes of subsystem 750 and gain block 770 may be related to execution times of the blocks, memory foot prints for the blocks, operating temperatures of silicon used to execute code for the blocks, etc.

The embodiment of FIG. 7C may provide a user with a visual representation (e.g., interim output signal 765) that indicates when during execution of code for a given block that a particular operation takes place. For example, a user can determine that subsystem 750 provides interim output signal 765 to gain block 770 based on the line and arrow head running from subsystem 750 to gain block 770. The user may further determine that subsystem 750 produces interim output 765 approximately ⅔rds of the way through execution of code making up subsystem 750. Still further, the user can determine that gain block 770 receives interim output signal 765 after executing approximately 25% (or one-quarter) of the code making up gain block 770.

The embodiment of FIG. 7C can be used with models of substantially any size and/or complexity to provide users with information about execution relationships among components in a model. The embodiment of FIG. 7C can be modified to provide users with additional information such as processing logic identifiers. For example, if the model of FIG. 7C were executed on two cores, subsystem 750 can identify a first core and gain block 770 can identify a second core on which the respective blocks will execute.

Graphical representations can further assist users in identifying situations when it might be beneficial to concurrently execute modeled algorithms on multiple cores. By way of example, graphical representations can be used to indicate when interim inputs/outputs are available and/or or when the interim inputs/outputs can be used, e.g., used for processing. In FIG. 7C, graphical representations may be used to indicate that approximately ⅓ of the monitor subsystem algorithm can be run concurrently with approximately ¾ of the gain block algorithm. Graphical representations can be used to indicate the existence of algorithm concurrency and/or for automatically mapping respective portions of concurrent algorithms to pieces of processing logic, such as cores, FPGA's, etc.

Components in the model of FIG. 7C can be further modified to indicate whether a component operates in real-time or soft real-time, to provide the user with additional information when a pointing mechanism (e.g., cursor) is placed proximate to a region of a model, etc.

Exemplary User Interfaces

Embodiments of system 100 may display information to a user using a number of techniques. In one embodiment, information may be displayed to a user via a graphical user interface and/or via an interactive report.

Figure 8A:
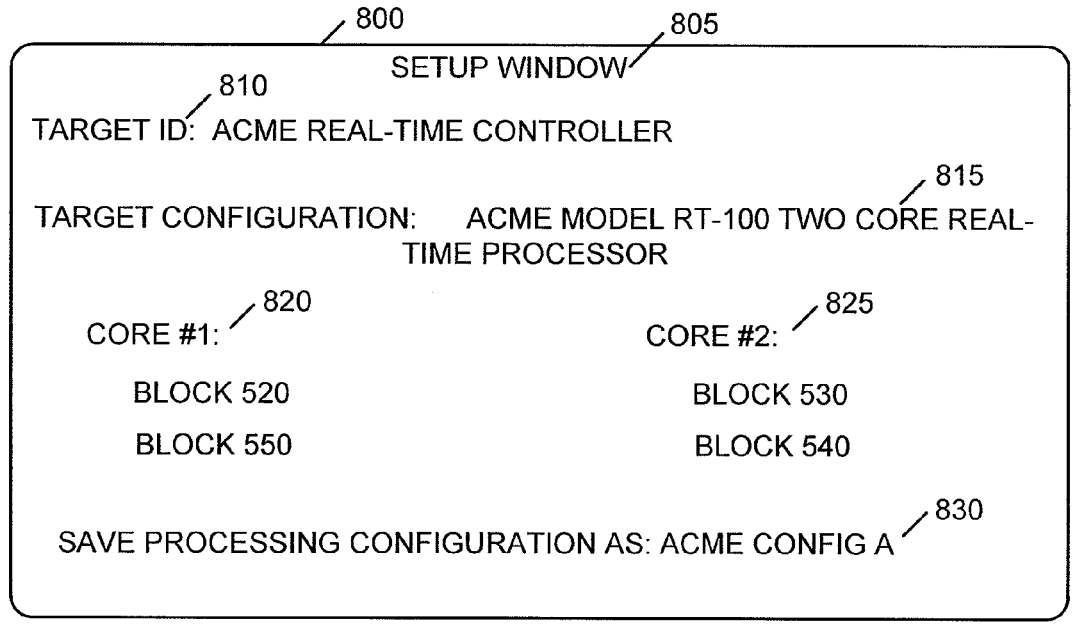
Figure 8B:
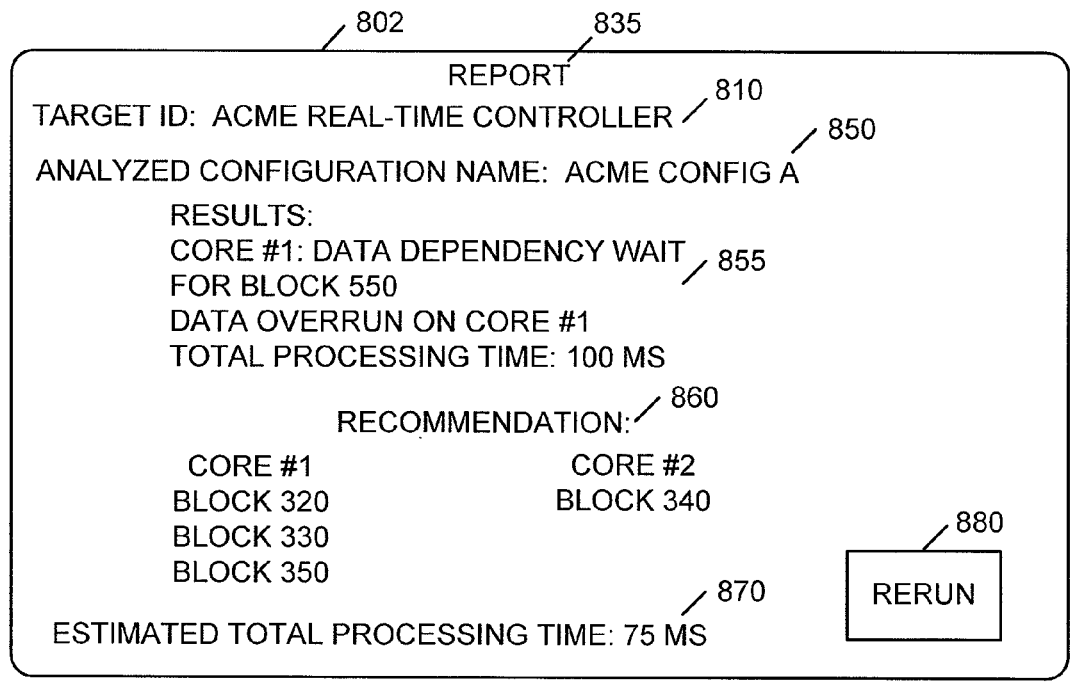

FIGS. 8A-8C illustrate exemplary user interfaces that can be used with embodiments. A user may wish to configure system 100 before performing modeling activities, scheduling activities, code generating activities, etc. In an embodiment, display 800 may be provided to a user to allow the user to configure system 100.

Display 800 may include window identifier 805, target identifier 810, target configuration 815, processing logic identifier 820 and 825 and output identifier 830. Window identifier 805 may identify to what information in display 800 pertains. For example, display 800 may pertain to setup activities for configuring system 100 to generate code for target environment 130.

Target identifier 810 may identify target environment 130. Target identifier 810 may identify target environment 130 using a name, address (e.g., network address), or other type of identifier. Target configuration 815 may identify configuration information about target environment 130. For example, computer 110 may use information provided for target identifier 810 to establish a connection with target environment 130 over network 160. Computer 110 may query target environment 130 and may obtain information that identifies how target environment 130 is configured. For example, the obtained information may indicate that target environment 130 includes an ACME RT-100 real-time processor that includes two cores. The target may be available as hardware or it may be emulated. For example, an instruction-set simulator may be available to execute generated code.

Processing logic identifier 820 and 825 may identify information about processing logic identified in target configuration 815. For example, processing logic identifier 820 may indicate which blocks of a model are executed on the first core of target environment 130 and processing logic identifier 825 may indicate which blocks of the model are executed on the second core of target environment 130. Output identifier 830 may identify a file name, storage location, etc., to which information about target environment 130, a model for use on target environment 130, or the contents of display 800 is stored.

FIG. 8B illustrates a user interface that can be used to display information about a schedule for executable code. For example, the user may enter information about target environment 130 using display 800 and computer 110 may perform processing operations in response to the inputs. Computer 110 may provide results of the processing to the user via display 802 of FIG. 8B. In an embodiment, computer 110 may have performed processing related to determining a schedule for code segments in generated code adapted to execute on target environment 130. Results of this processing may be displayed using display 802.

In FIG. 8B, display 802 may include a target identifier 810, window identifier 835, configuration identifier 850, results region 855, recommendation region 860, estimated processing time 870, and rerun button 880. Window identifier 835 may indicate to the user that information in display 802 is related to a report describing an expected performance of target environment 130 when executing code generated from a model. Target identifier 810 may identify target environment 130 and configuration identifier 850 may identify a particular hardware and/or software configuration for target environment 130 that was evaluated by computer 110. For example, information in configuration identifier may specify a type of: processing logic, real-time operating system, virtualization scheme, memory configuration, bus configuration, target environment scheduling, etc., in use or that will be in use on target environment 130 when generated code is executed.

Results region 855 may include information that identifies outcomes or results of processing performed by computer 110 on behalf of target environment 130 or that was performed by target environment 130 using the configuration identified in configuration identifier 850. For example, results region 855 may indicate: that core #1 incurred a waiting interval because of a data dependency issue for one or more blocks in a model, that core #1 sustained a data overrun for one or more blocks executing on core #1, that a total processing time for core #1 was 100 ms, etc.

Recommendation region 860 may include information about a configuration that differs from a configuration that was analyzed to determine whether target environment 130 could operate according to a constraint. For example, computer 110 may programmatically determine that blocks making up a model can be grouped into updated collections, where the updated collections will allow core #1 and core #2 to perform real-time processing. Recommendation region 860 may display the contents of the updated collections to a user.

Estimated processing time 870 may provide a processing time estimate based on the updated schedule that takes into account the updated collections displayed in recommendation region 860. Rerun button 880 may rerun a model, generated code on target environment 130, or code that performs processing estimates for target environment 130 using target characteristics. In an embodiment, information in configuration identifier 850, results region 855 and/or recommendation region 860 may be updated when rerun button 880 is selected.

FIG. 8C illustrates an exemplary interactive report 890 that can be used to allow a user to interact with computer 110. In an embodiment, a user may interact with report 890 to specify operating characteristics for target environment 130 and/or simulation environment 120. For example, report 890 may allow a user to specify task scheduling mechanisms, information about whether parallel execution is supported on target environment 130, preferred data transfer mechanisms, allowing scheduling overruns, etc. Report 890 may also include a region for displaying information about computational throughput, such as processing times for various code segments (e.g., code segments implementing algorithms), etc.

In an embodiment, an interactive report may programmatically populate portions of report 890 based on received user inputs. Information included in report 890 may be stored, transmitted to a destination, printed, etc., based on user actions or programmatic instructions executed in system 100.

Exemplary Architecture

Figure 9:
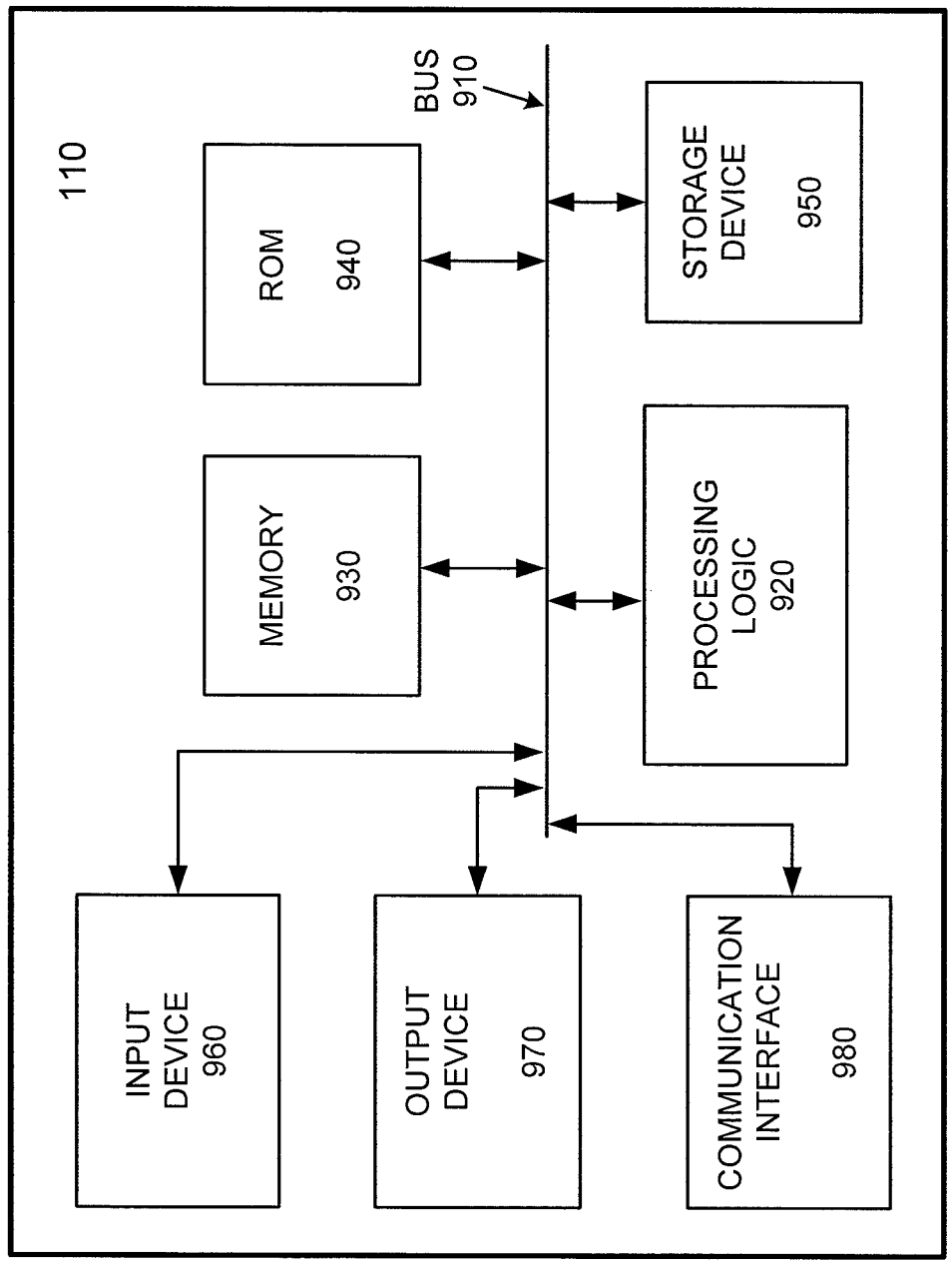
FIG. 9 illustrates an exemplary computing architecture for practicing an embodiment.

FIG. 9 illustrates an exemplary computer architecture that can be used to implement computer 110 of FIG. 1. FIG. 9 is an exemplary diagram of an entity corresponding to computer 110. As illustrated, the entity may include a bus 910, processing logic 920, a main memory 930, a read-only memory (ROM) 940, a storage device 950, an input device 960, an output device 970, and/or a communication interface 980. Bus 910 may include a path that permits communication among the components of the entity.

Processing logic 920 may include a processor, microprocessor, or other types of processing logic (e.g., FPGA, GPU, DSP, ASIC, etc.) that may interpret and execute instructions. In one implementation, processing logic 920 may include a single core processor or a multi-core processor. In another implementation, processing logic 920 may include a single processing device or a group of processing devices, such as a processing cluster or computing grid. In still another implementation, processing logic 920 may include multiple processors that may be local or remote with respect each other, and may use one or more threads while processing.

Main memory 930 may include a random access memory (RAM) or another type of dynamic storage device that may store information and instructions for execution by processing logic 920. Embodiments of the invention may employ data stores associated with memory 930 for storing execution schedules, program code, optimization algorithms, etc. Data stores can include, but are not limited to, files, data structures, graphical user interfaces, online reports, etc.

ROM 940 may include a ROM device or another type of static storage device that may store static information and/or instructions for use by processing logic 920. Storage device 950 may include a magnetic, solid state and/or optical recording medium and its corresponding drive, or another type of static storage device that may store static information and/or instructions for use by processing logic 920.

Input device 960 may include logic that permits an operator to input information to the entity, such as a keyboard, a mouse, a pen, a touchpad, an accelerometer, a microphone, voice recognition, camera, neural interface, biometric mechanisms, etc. Output device 970 may include a mechanism that outputs information to the operator, including a display, a printer, a speaker, a haptic interface, etc. Communication interface 980 may include any transceiver-like logic that enables the entity to communicate with other devices and/or systems. For example, communication interface 980 may include mechanisms for communicating with another device or system via a network.

The entity depicted in FIG. 9 may perform certain operations in response to processing logic 920 executing software instructions contained in a computer-readable medium, such as main memory 930. A computer-readable medium may be defined as a physical or logical memory device. The software instructions may be read into main memory 930 from another computer-readable storage medium, such as storage device 950, or from another device via communication interface 980. The software instructions contained in main memory 930 may cause processing logic 920 to perform processes described herein when the software instructions are executed on processing logic. Alternatively, hardwired circuitry may be used in place of or in combination with software instructions to implement processes described herein. Thus, implementations described herein are not limited to any specific combination of hardware circuitry and software.

Although FIG. 9 shows exemplary components of the entity, in other implementations, the entity may contain fewer, different, or additional components than depicted in FIG. 9. In still other implementations, one or more components of the entity may perform one or more tasks described as being performed by one or more other components of the entity.

Exemplary Processing

Figure 10A:
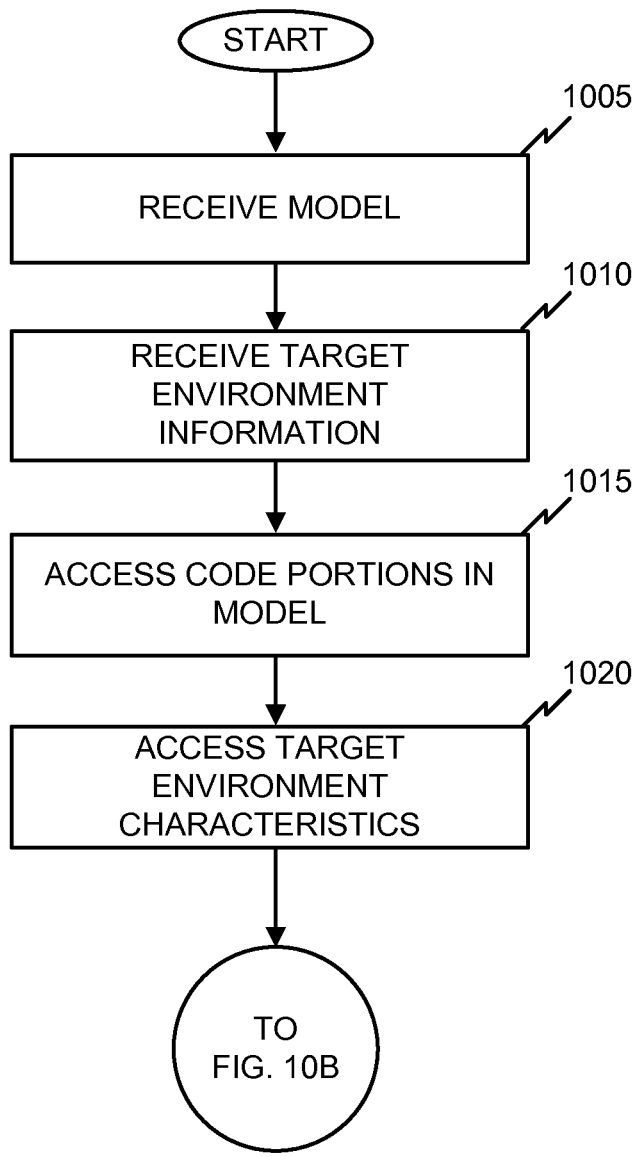
FIGS. 10A and 10B illustrate exemplary processing for implementing an embodiment.
Figure 10B:
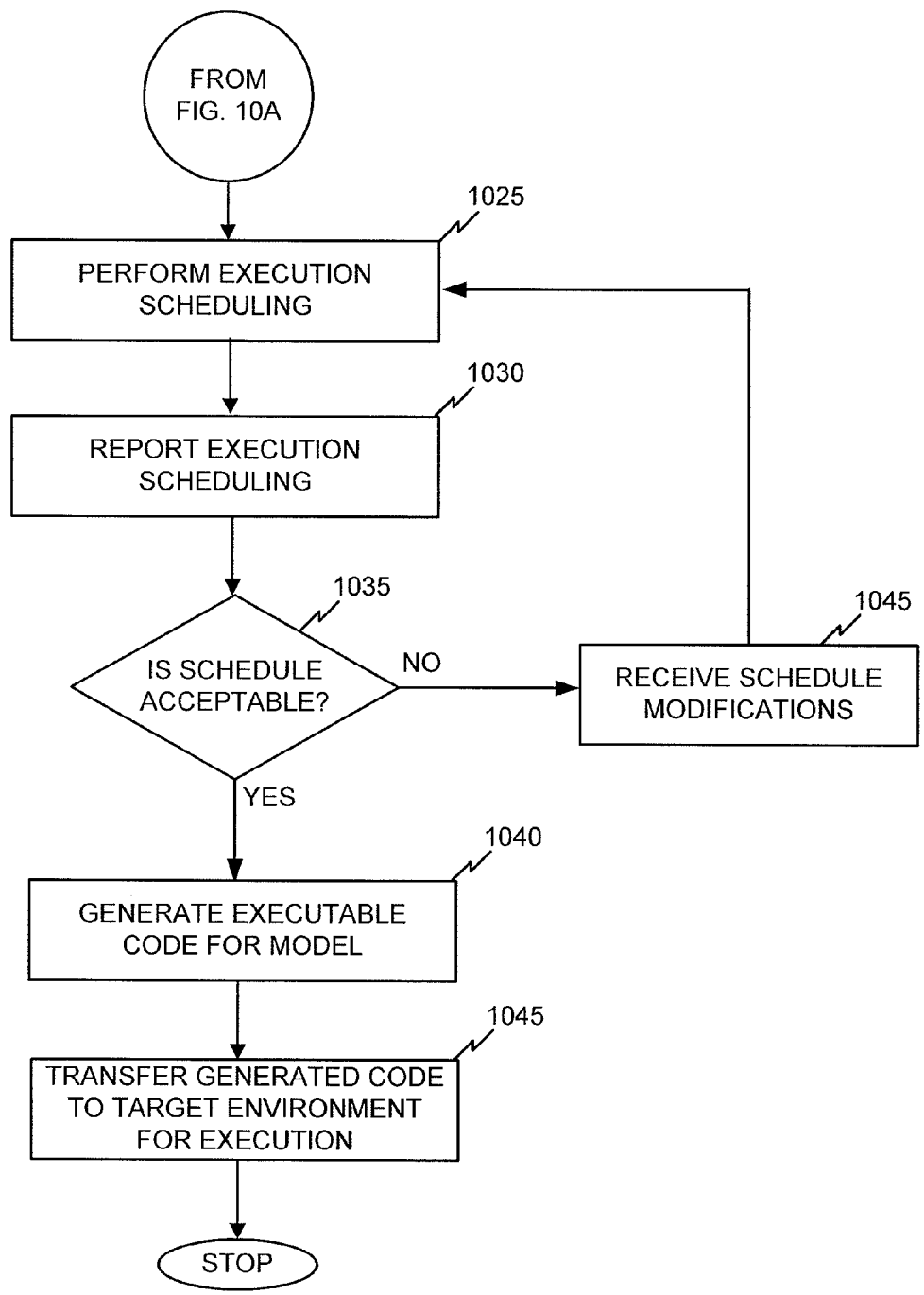

FIGS. 10A and 10B illustrate exemplary processing for implementing an embodiment. Processing may begin when a model is received (act 1005). For example, an executable graphical model for a physical system, e.g., a physical computing system, may be received at computer 110 via interface logic 230. The model may include a number of blocks and connections that collectively simulate the physical system when executed. These blocks may have underlying source code for implementing the functionality of the blocks. The code may include many functions (e.g., code segments) that operate at different rates when the model is executed. For example, some code segments may execute every 1ms, other code segments may execute every 2 ms, and still other code segments may execute every 4 ms. The functions may operate with different offsets. For example, a code segment may execute every 1ms with no offset, other code segments may operate at 2 ms with a 1ms offset, and still other code segments may execute every 4 ms with a 3 ms offset. In the model, still other code segments may only execute in response to specified events.

Depending on an implementation of the model, the code segments may execute according to, for example, rate monotonic scheduling, earliest deadline first scheduling, or according to multi-tasking scheduling. For example, it may be desirable to decouple the 0.1 ms code from the 0.2 ms code during model execution. In this situation, multi-tasking scheduling may be used. In contrast, if it is desirable to maintain coupling between code executing a different rates, rate monotonic scheduling may be used.

Computer 110 may query target environment 130 for target characteristics via interface logic 230 and network 160. Target environment 130 may transmit target characteristics to computer 110 in response to the query. For example, the target characteristics may include information about a number and/or type of real-time logic 140, RT-O/S 135, memory, bus type and/or bandwidth, clock rate, input/output interface type and/or throughput, compiler type, software applications, types of scheduling, whether preemption is supported, etc.

Computer 110 may receive and may process the received target characteristics to determine what type of scheduling to use when simulating the model and/or when generating code from the model (act 1010). For example, computer 110 may evaluate the target characteristics and may determine that target environment 130 can support multi-tasking scheduling. In this situation, computer 110 may perform simulations of the model using multi-tasking scheduling and may generate code that is adapted for multi-tasking scheduling when executed on target environment 130.

In another embodiment, computer 110 may cause benchmarking code to be executed on target environment 130, where the benchmarking code is configured to determine performance characteristics of target environment 130 when executing certain code. Computer 110 may receive benchmarking results produced when the benchmarking code is executed on target environment 130. Computer 110 may process the benchmarking results to make determinations with respect to scheduling the execution of blocks in the model when the model is simulated on computer 110 or for code generated by computer 110 for use on target environment 130.

Code portions for the model may be accessed (act 1015). For example, scheduler 230 may receive code for blocks that will be executed on target environment 130. Scheduler 230 may also access target environment characteristics that are relevant to scheduling code that will execute on target environment 130 (act 1020).

Referring now to FIG. 10B, scheduler 230 may perform execution scheduling on the code portions of the model (act 1025). Embodiments may allow a user to input an initial execution schedule or may programmatically determine an initial execution schedule with or without user input. For example, scheduler 230 may use target characteristics when determining an execution schedule for components of an executable model. The use of target characteristics allows scheduler 230 to account for actual configurations and/or capabilities of target environment 130 when determining an execution schedule. For example, scheduler 230 may take some or all of the following target characteristics into account: number and/or types of processing logic, amount and type of memory, clock speeds for processing logic and/or memories, input/output interfaces, power requirements, and types of real-time scheduling protocols.

A report identifying execution scheduling for generated code configured to execute on target environment 130 may be provided to a user (act 1030). For example, an embodiment may provide display 802 or report 890 to a user. Alternatively, the embodiment may provide the report via a hardcopy or a file.

Computer 110 or the user may determine whether the provided execution schedule is acceptable for a particular segment of generated code that will execute on target environment (act 1035). For example, system 100 may color code portions of display 802 or report 890 to indicate whether certain model components will execute in real-time on target environment 130. Alternatively, a textual identifier may be used to indicate whether an evaluated execution schedule will satisfy real-time constraints when code is executed on target environment 130. Still other embodiments may identify whether schedules are acceptable or unacceptable in still other ways without departing from the spirit of the invention. For example, by superimposing this information on the graphical model or by modifying graphical affordances of the elements in the graphical model, such as the width of blocks and position of connection points.

When an execution schedule is not acceptable in act 1035, system 100 may receive schedule modifications (act 1045). For example, a user may have initially proposed that blocks execute according to the arrangements of FIGS. 6A and 6B. In response to evaluating an execution schedule for this arrangement, the user may be provided with report 890 that may indicate that the evaluated schedule is unacceptable for real-time operation on target environment 130. The user may enter an updated execution schedule by identifying another execution arrangement for components of a model, e.g., as shown in FIGS. 7A and 7B. System 100 may perform execution scheduling for the updated schedule at act 1025 and may provide updated scheduling results at act 1030.

When an execution schedule is acceptable at act 1035, code may be generated for the model (act 1040). An embodiment may generate executable source code or machine code that is configured to execute on target environment 130. For example, code generator 290 may generate C++ source code from an executable graphical model built in simulation environment 120 by a user. The C++ code may be configured to execute in real-time on target environment 130 after the code is compiled.

Computer 110 may transfer the generated code to target environment 130 via network 160, or via another mechanism such as a portable storage device or wireless link (act 1045). The transferred code may be stored on target environment 130 and executed at a determined time or upon occurrence of an event. The code, when executed on target environment 130, may perform real-time operations according to an execution schedule determined on computer 110 using target characteristics.

In the discussion of FIGS. 10A and 10B, execution schedules were evaluated prior to generating code for execution on target environment 130. Embodiments may be configured to perform execution scheduling assessments after code is generated for target environment 130. For example, target characteristics may be received at computer 110 from target environment 130. Computer 110 may generate code for a specified arrangement of model components, where the arrangement reflects an execution schedule on target environment 130. Computer 110 may determine whether generated code will execute in real-time on target environment 130 using the received target characteristics before transferring the generated code to target environment 130. When the generated code will not execute in real-time on target environment 130, computer 110 may request that a user specify an updated execution schedule or computer 110 may programmatically determine an updated execution schedule. Computer 110 may generate updated code using the updated execution schedule, and then computer 110 may determine whether the updated code will execute in real-time on target environment 130. When the updated code will execute in real-time on target environment 130, computer 110 may transfer the updated code to target environment 130.

Embodiments can perform execution scheduling for multiple target environments, such as two or more target environments 130 operating in a real-time computing cluster that performs parallel processing. In such an embodiment, computer 110 may evaluate execution schedules that support load balancing among the target environments 130 so as to avoid or reduce idle times of target environments 130 when parallel processing activities are taking place. Computer 110 can be further configured to account for homogeneous or heterogeneous execution schedules among the target environments 130.

Embodiments of system 100 can also be configured to produce consistent results between simulations performed on computer 110 using simulation environment 120 and for results produced by executing corresponding generated code on target environment 130. For example, computer 110 may compare results produced by simulation environment 120 with results produced on target environment 130. Computer 110 may use an acceptable range of deviation between simulation results and target environment results to determine that the two results are similar enough to be deemed acceptable.

Embodiments can further be configured to optimize certain characteristics of target environment 130. For example, computer 110 can perform execution scheduling for generated code that is adapted to minimize power consumption on target environment 130 when target environment 130 executes the generated code. Assume that target environment 130 has two real-time processors. Computer 110 may perform execution scheduling that causes the real-time processors to go into a power saving mode (e.g., by running at a reduced clock speed or by powering down) when not actively engaged in real-time computations. Alternatively, if one real-time processor consumes less power than the other real-time processor during computations, computer 110 may cause the lower power real-time processor to operate near 100% capacity while the higher power real-time processor spends time in a power saving mode while still allowing target environment 130 to operate within a real-time constraint.

Embodiments can be configured to delay a clock for a first group of model components with respect to a clock for a second group of components when delaying one clock with respect to another improves execution scheduling. For example, computer 110 may determine that starting both clocks at the same time relative to each other produces generated code that cannot satisfy a real-time constraint when executed on target environment 130. Computer 110 may then determine an updated schedule that indicates that the real-time constraint can be met when one clock is started at, e.g., t=0 ms, and the other clock is started at t=2 ms. Computer 110 may generate an execution schedule that uses the offset clocks when generating code for target environment 130.

Embodiments can further be configured to generate code for execution on target environment that can include an execution environment capable of being abstracted via RT-O/S 135. For example, generated code sent from computer 110 to target environment 130 can utilize and/or interface to the execution environment to achieve desired execution scheduling and/or data communications. The execution environment may provide additional application program interfaces (APIs) to facilitate execution scheduling and/or data communication on target environment 130. Examples of APIs that can be used may include, but are not limited to, portable operating system interface (POSIX) threads, multi-core communication API (MCAPI), message passing interface (MPI), OpenMP (by openmp.org), Intel threading building blocks (TBB), boost C++ threads, AUTOSAR, etc. Information about these APIs can be fed back to computer 110 in target characteristics so that a model can leverage the APIs in code generated from the model.

Exemplary embodiments can be implemented in modeling domains that differ from ones explicitly discussed herein without departing from the spirit of the invention. For example, an executable model may be a model in a formalism that has executable semantics. Embodiments may also be implemented using simulation environments that are modeling environments.

Exemplary embodiments can be configured using techniques described herein and/or known in the relevant art to perform still other operations in conjunction with schedulability analysis. For example, an embodiment can be configured to optimize task partitioning based on data flow in a model.

Figure 11:
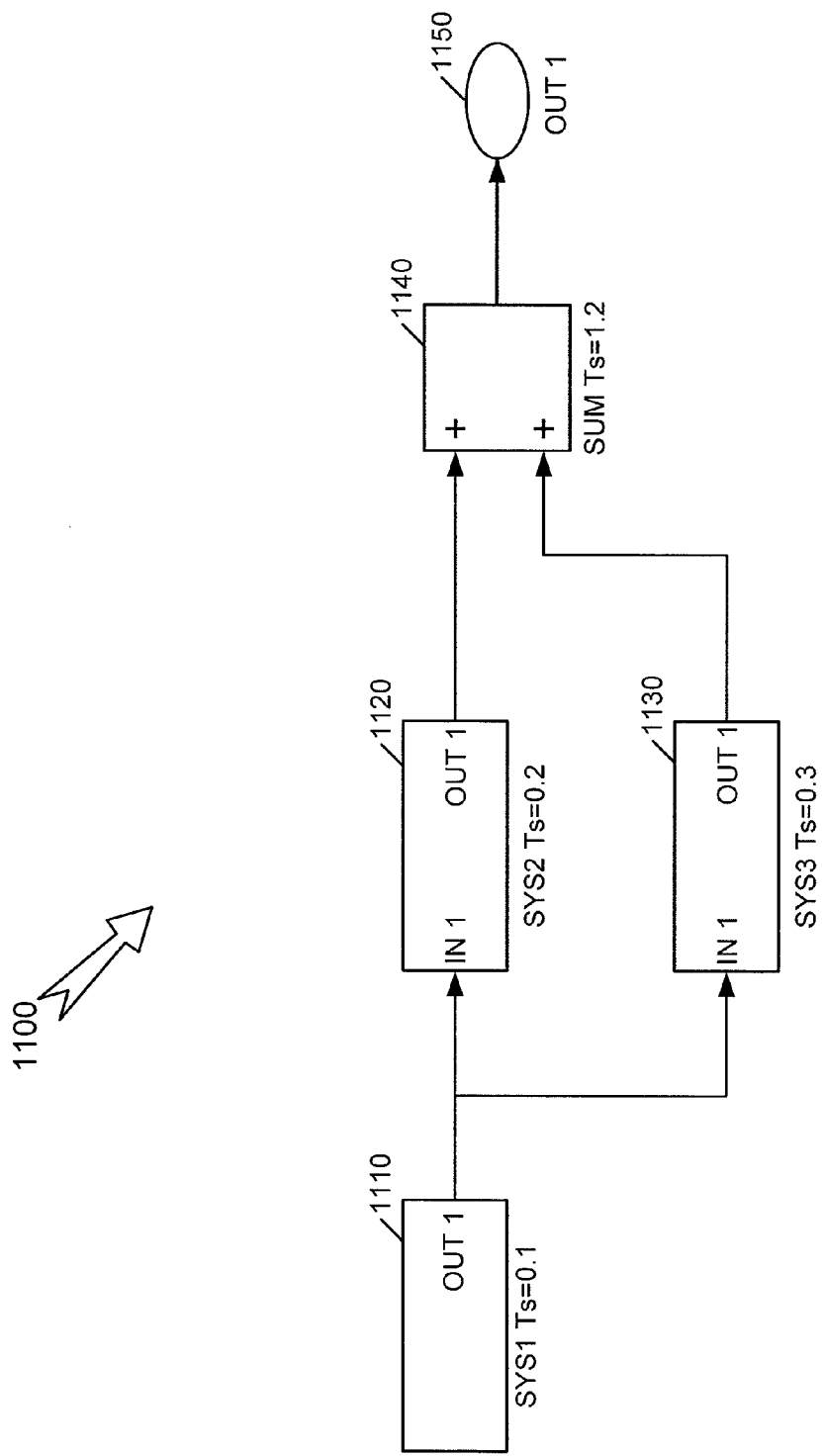
FIG. 11 illustrates an exemplary model that includes components having different sample times.

Referring to FIG. 11, a model 1100 may include blocks 1110, 1120 and 1130 representing systems, such as physical computing systems. For example, block 1110 may represent system 1 and may have a sample time of 0.1 ms. Block 1120 may represent system 2 and may have a sample time of 0.2 ms, and block 1130 may represent system 3 and may have a sample time of 0.3 ms. In the example of FIG. 11, block 1110 may output a signal to blocks 1120 and 1130. Model 1100 may also include summation block 1140. Block 1140 may have a sample time of 1.2 ms. Block 1140 may receive output signals from block 1120 and block 1130 and may sum the received signals to produce an output signal that is provided to Output 1, labeled as block 1150.

In model 1100, the downstream summation block 1140 has a sample time of 1.2 ms which is slower than the sample times for upstream blocks, namely block 1120 (Ts=0.2 ms), block 1130 (Ts=0.3 ms) and block 1110 (Ts=0.1 ms). Since the downstream block 1140 is slow compared to upstream blocks, model 1100 may be optimized by having the computations corresponding to the upstream blocks execute in tasks that run slower, e.g., by using a low power processor that runs at a reduced clock rate. For example, upstream blocks 1110, 1120, and 1130 can run tasks having sample times of 0.1, 0.2, 0.3, 0.4, 0.6 and 1.2 ms without causing block 1140 to wait for data. The embodiment may schedule code segments among the sample times in a manner that does not cause block 1140 to wait for data. The scheduling in model 100 may serve to balance loads for some or all tasks in model 1100. This load balancing may serve to optimize model 110 according to a determined criteria, such as low power, a certain processor cost, reducing processor idle time, etc.

Embodiments can be configured to perform accurate schedulability analyses based on information known about a model. For example, various intermediate representations may be produced from a graphical model as the model is compiled. The intermediate representations can provide information to scheduler 250 to allow accurate schedule analyses and/or schedule determination. For example, block optimizations, signal optimizations, block or signal relocations, data dependencies, execution rates, expression folding, FOR loop fusion, task remapping, task regrouping, inserting/deleting buffers or blocks (e.g., rate transition buffers), etc., can be performed during the lowering of intermediate representations and this information can be provided to scheduler 250.

Figure 12A:
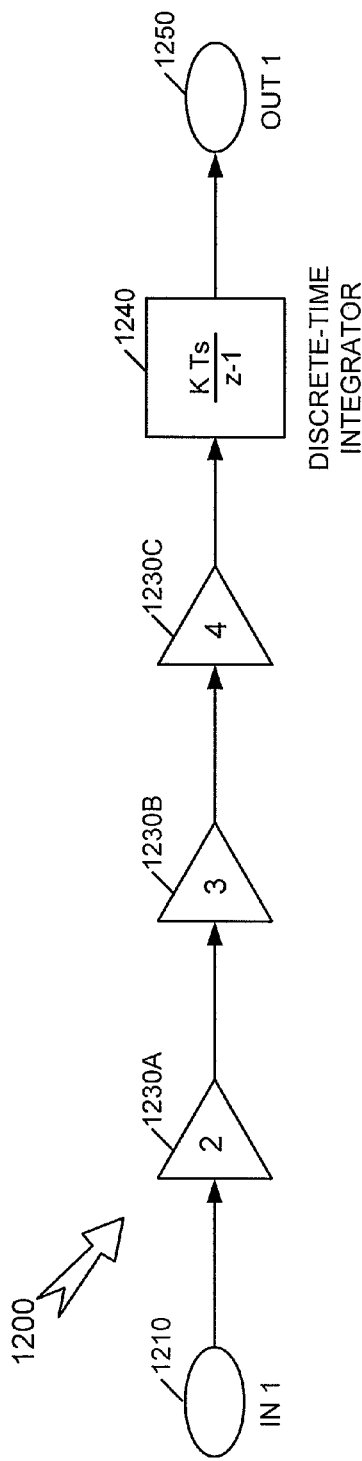
FIG. 12A illustrates a model from which an intermediate representation is generated.

FIG. 12A illustrates a model 1200 that includes an input 1210, gain blocks 1230A, B, and C, discrete time integrator 1240, and output 1250. Model 1200 may be transformed into one or more intermediate representations to generate a compiled version of model 1200. Scheduler 250 may accept information about model 1200 from various stages of intermediate representations and may use the information when performing schedulability analysis for components of model 1200.

Input 1210 may provide an input signal to components in model 1200. Gain blocks 1230A, B, and C may receive a signal and may amplify the signal by a constant value to produce an amplified output signal. Integrator 1240 may integrate a received signal to produce an integrated output signal. Output 1250 may receive a signal and may output the signal to storage, another model, a subsystem, another block, a function, a method, a display device, etc. In an embodiment, integrator 1240 may include a constant K that can be multiplied with a sample time parameter and/or another parameter. When model 1200 is transformed to an intermediate representation, optimizations can be performed. For example, constants associated with gain blocks 1230A-C can be optimized out of the model using, for example, expression folding techniques.

Figure 12B:
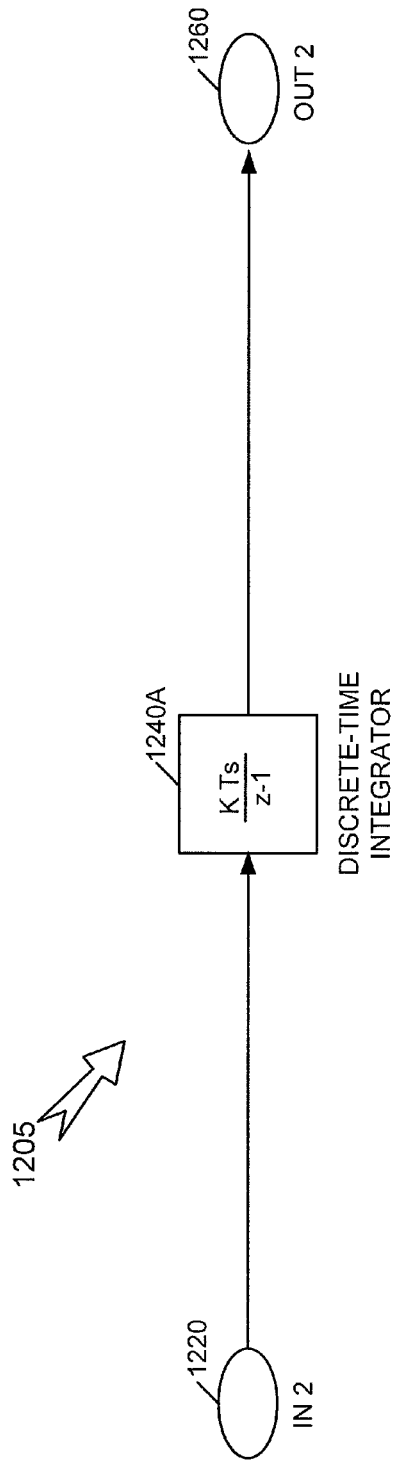
FIG. 12B illustrates an exemplary intermediate representation for the model of FIG. 12A.

FIG. 12B illustrates a model 1205 that does not include gain blocks 1230A-C. In model 1205, the gains associated with blocks 1230A-C have been optimized out of the model and values for the gains have been included in the constant K of integrator 1240A. In an embodiment, model 1205 represent a model when the model is expressed in an intermediate representation.

Optimization techniques can be used to reduce, remap, or regroup, the number or type of blocks in an intermediate representation as compared to the number/type of blocks in a model from which the intermediate representation is produced.

Figure 13:
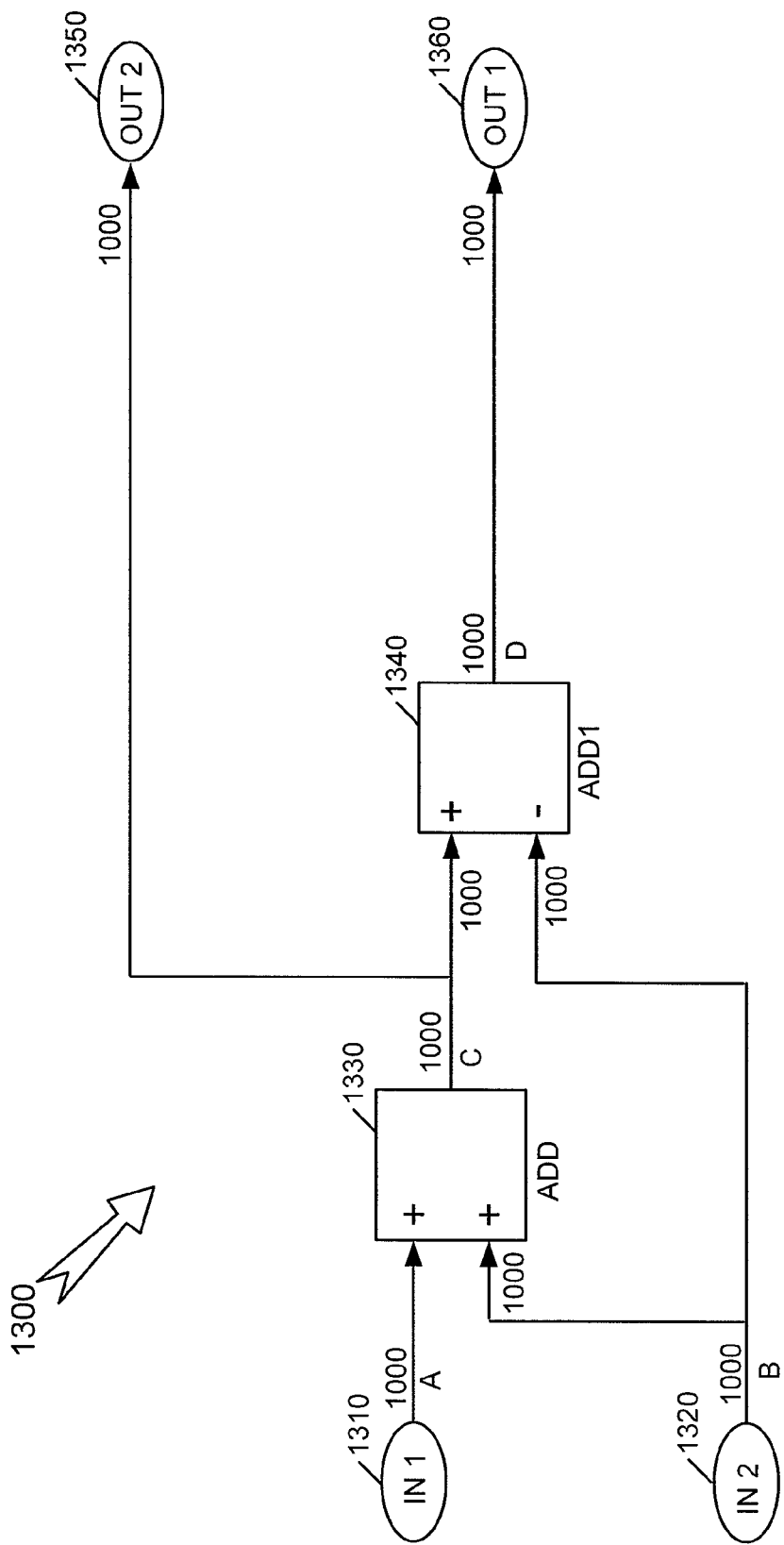
FIG. 13 illustrates an exemplary model that includes adders.

FIG. 13 illustrates a model 1300 that includes two input ports 1310 and 1320, two adders 1330 and 1340, and two output ports 1350 and 1360. Input ports 1310 and 1320 may provide signals to adders 1330 and 1340. Adders 1330 and 1340 may receive input signals and may add or subtract the input signals with respect to each other to produce an output signal. Output 1350 and 1360 may receive signals and provide the signal to storage, another model, a subsystem, another block, a function, a method, a display device, etc.

In model 1300, two-thousand (2000) addition blocks are used to perform calculations. When model 1300 is converted to an intermediate representation, only one-thousand (1000) addition blocks are needed because signal D is actually equal to signal A. Scheduler 250 can accept information from the intermediate representation and can perform scheduling operations that account for 1000 addition blocks instead of 2000 addition blocks.

Figure 14:
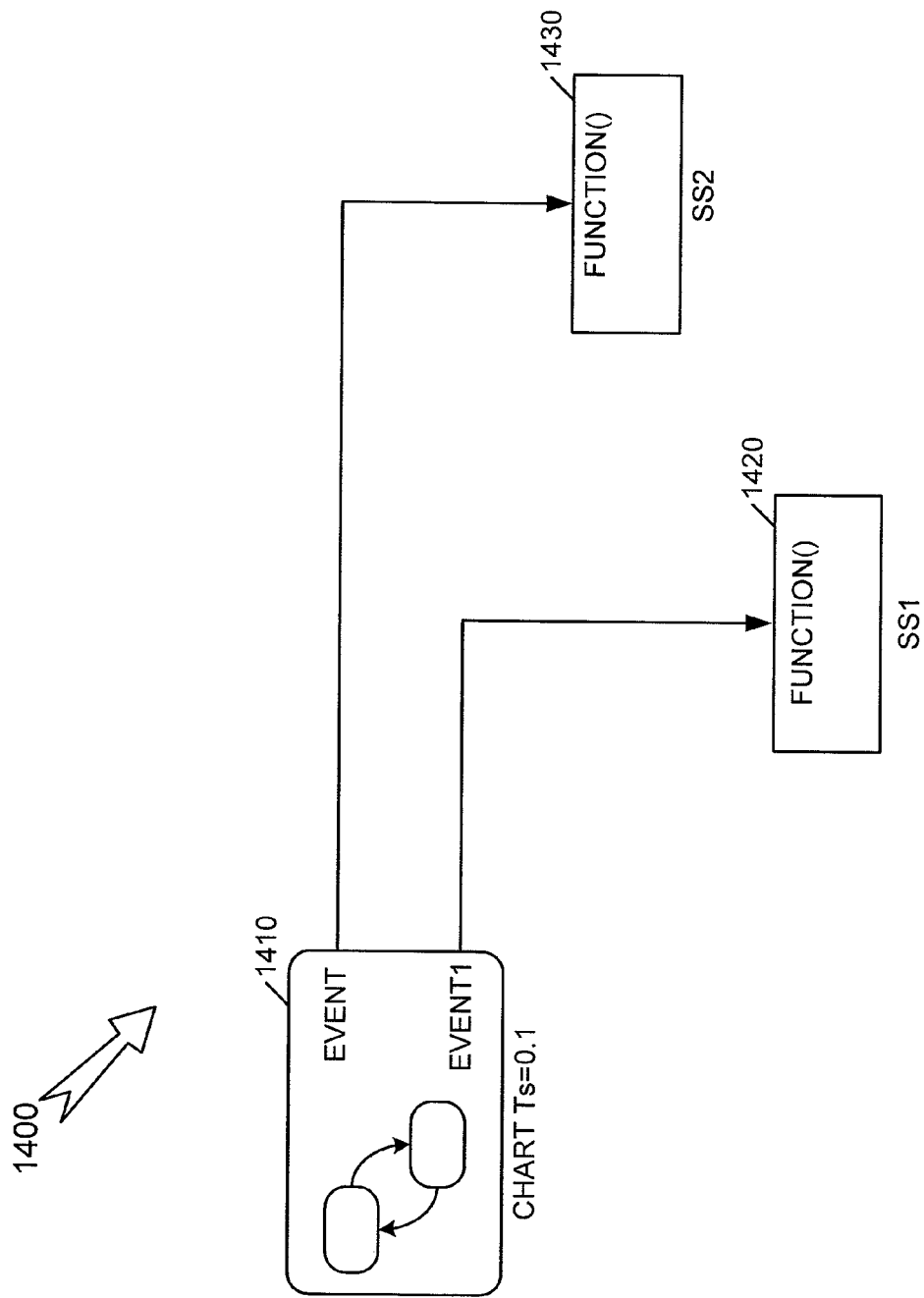
FIG. 14 illustrates an exemplary state chart that can be used with an embodiment of the invention.

FIG. 14 illustrates a state based implementation of a model. State chart 1400 may schedule a conditionally executed subsystem in block 1420 or 1430. Block diagram analysis may be performed and information from the analysis can be provided to scheduler 250. For example, it may be determined based on the analysis that task SS1 and task SS2 need to be scheduled in a base rate task Ts=0.1 ms. An intermediate representation analysis of state chart 1400 may indicate that SS1 runs every $5^{th}$ sample hit of 0.1 ms and that SS2 runs every other time that SS1 runs. Schedulability analysis may determine that SS1 and SS2 should be placed in a subrate.

Exemplary embodiments can be configured and/or implemented in still other ways to benefit from schedulability analysis. For example, schedulability analysis may include optimizing code by inserting an execution of code to improve the schedulability of generated code as compared to schedulability of the generated code without performing the optimization.

Figure 15A:
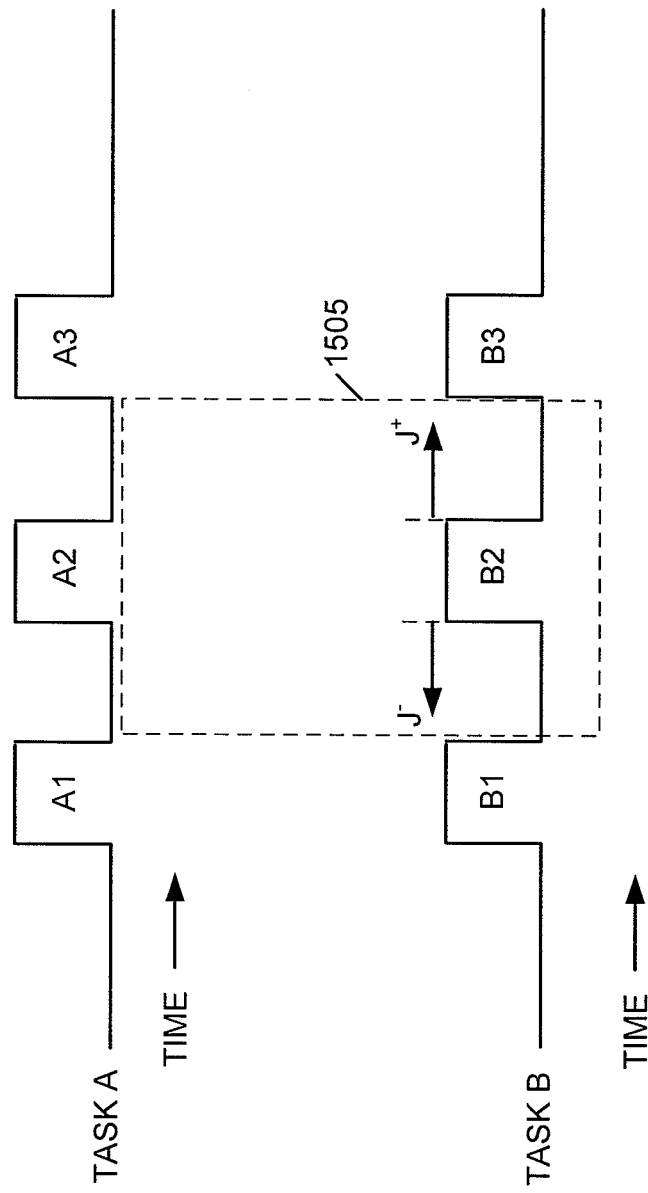

Referring to FIG. 15A, an implementation may include two tasks A and B where each task includes a number of functions, or other types of code. For example, task A can include functions A1, A2, and A3 and task B can include functions B1, B2, and B3. In FIG. 15A, the functions may execute at different times, with function A1 executing before functions A2 and A3 and function B1 executing before functions B2 and B3. The implementation of FIG. 15A may include constraints that are associated with task A and/or task B. For example, a constraint may indicate that function B2 should not execute until after function A2 executes and that function B2 should further execute before function A3 executes. The constraint may specify an execution window 1505 for function B2, where function B2 is said to satisfy the constraint when function B2 executes within the boundaries of execution window 1505. For example, execution window 1505 may allow function B2 to have some amount of jitter, where jitter indicates a deviation in positive time ($J^+$ in FIG. 15A) or negative time ($J^-$ in FIG. 15A) with respect to a nominal execution time at which function B2 is expected to execute.

Task A and task B may share data in the implementation of FIG. 15A. For example, referring to FIG. 15B, the implementation may further include Buffer A 1510 for storing information produced by functions and/or used by functions. For example, task A may execute and function A1 may write to buffer location 1520. After function A1 writes to buffer location 1520, task A3 may execute and may overwrite the information in buffer location 1520 with new information. In the embodiment of FIG. 15B, Buffer 1510 may be shared with task B. For example, function B2 may read a value from buffer location 1520 when function B2 executes.

In the implementation of FIG. 15B, proper execution of task B may require that function A1 execute before function B2, otherwise function B2 will read an invalid value (e.g., an old value) from buffer location 1520. In addition, proper execution of task B may require that function B2 complete execution before function A3 begins to execute (as shown by execution window 1505 in FIG. 15A) otherwise, function B2 may read a value from buffer location 1520 that was overwritten by function A3 when function A3 was executed.

For sake of example, assume that task B may overrun due to unexpected waits on account of an execution time for functions included in task A. In this example, it may be determined that task A and task B are coupled because function B2 reads a value associated with the execution of function A1. It may further be determined that making tasks A and B parallel tasks by decoupling them may allow tasks A and B to execute within a determined time interval, e.g., a real-time interval.

A first technique for de-coupling task A and task B, based on schedulability analysis, may include remapping some or all of task A or task B. For example, a portion of task A can be remapped (e.g., function A1) to eliminate overruns and/or undesirable wait intervals. Referring to FIG. 15C, function A1 may be remapped to task B so that function A1 is in both task A and task B. The remapping causes function A1 to be run twice, once in task A and once in task B and may remove waiting intervals for task A and/or task B. In this example, schedulability may be improved after remapping function A1, as compared to schedulability before function A1 was remapped into task B.

Figure 15D:
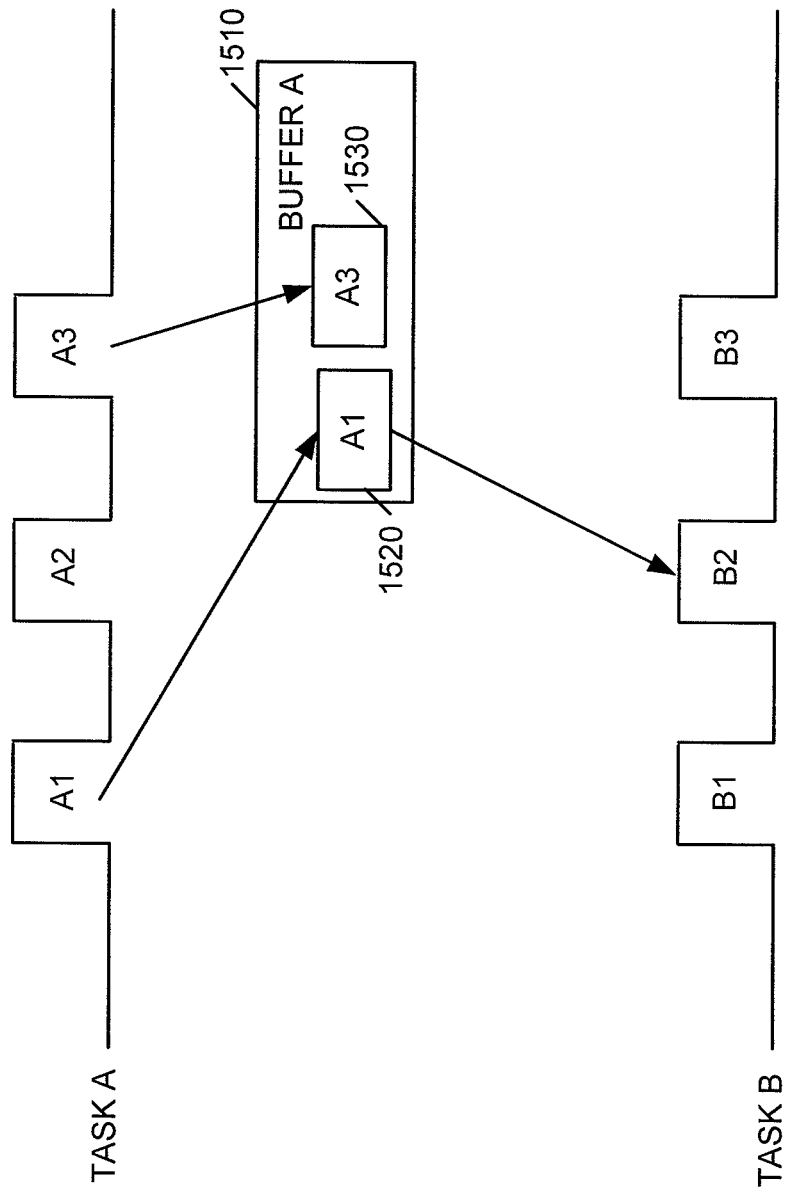

In a second implementation, additional memory (e.g., a cache) may be added to the embodiment of FIG. 15B, as shown as FIG. 15D, to improve schedulability. Referring to FIG. 15D, buffer location 1530 is added to buffer A and is configured to store information produced by function A3. In the implementation of FIG. 15D, function A1 executes and a value for buffer location 1520 is computed and stored. The value from buffer location 1520 is used by function B2 when it executes. If function A3 executes prior to function B2 executing, a current value in buffer location 1520 will not be overwritten since function A3 writes information to buffer location 1530. Buffer location 1530 may act as a rate transition buffer and may serve to decouple task A from task B during execution.

Implementations described herein can be configured to achieve determined execution times using schedulability results produced via schedulability analyses. Implementations can perform optimizations with respect to code, architecture usage, etc., based on schedulability results to help achieve desired execution times for generated code. For example, feedback can be employed to further tune code, parameters, etc., based on schedulability results. Assume that schedulability analysis indicates that one or more tasks overrun or are close to overrunning when code is executed. Results from this schedulability analysis can be fed back to a model, code generator, etc., to help optimize code (e.g., to make the code more efficient so that it executes faster) to avoid overruns.

Further assume that a schedulability analysis indicates that tasks have excess bandwidth when executed. Here a schedulability result can be fed back and used to optimize memory usage even if optimized memory usage may result in some of the tasks executing more slowly without causing overruns or other adverse outcomes. Optimizing memory usage may allow less expensive, smaller, slower, etc., memories to be used for the code than could have been used without optimizing the memory based on the schedulability analysis.

Exemplary Implementation

An implementation may generate a parallel intermediate representation to provide a graph-based representation for use in performing schedulability analysis on a model. The parallel intermediate representation may be an intermediate representation that is used to support schedulability analysis and may differ from other types of intermediate representations that may be used with a model or for generating code from the model. The parallel intermediate representation may be configured to capture parallelism and data rates implied by a source language.

The parallel intermediate representation may support a default model of execution times assigned to elements in the code. For example, the default model may be used for operations, function-calls, conditions, etc., in the code. In addition, the default model can be used for data (operands) and may include data types and/or memory locations.

The parallel intermediate representation may also represent code that is associated with different ones of concurrent threads, or tasks, of execution. Here the parallel intermediate representation may provide the ability to identify that a given segment of code or data is associated with a specific one of the concurrent threads of execution. The parallel intermediate representation may further support dependency analysis that can be used to identify opportunities where code may be further parallelized while still maintaining a functional equivalence for the code. The dependency analysis may further be able to represent additional parallel paths of execution.

The parallel intermediate representation may allow execution timing information to be augmented with target specific information (e.g., target specific timing information). The parallel intermediate representation may use the augmented information in place of the default information when performing schedulability analysis.

Figure 16A:
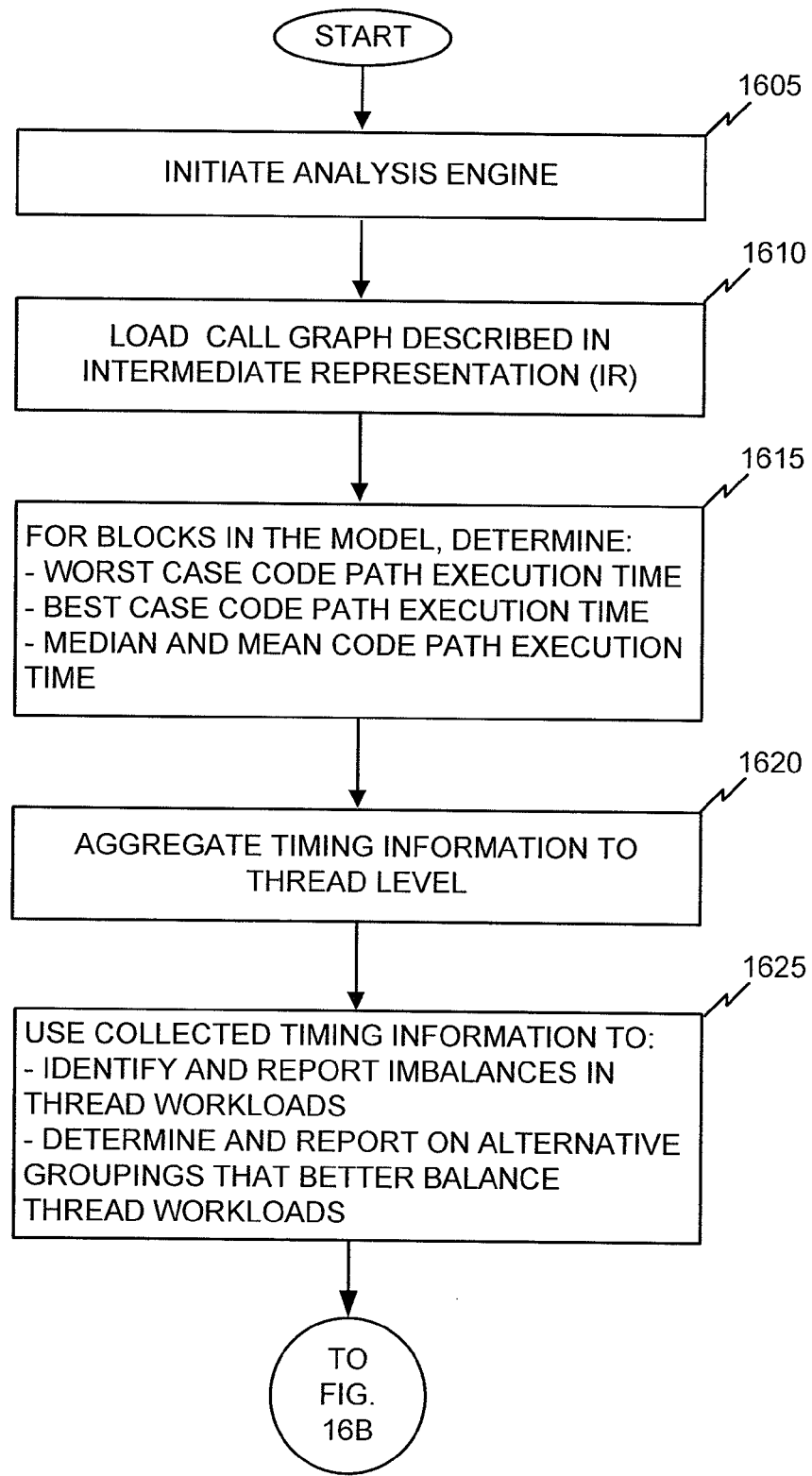
FIGS. 16A and 16B illustrate exemplary processing for practicing an implementation of the invention.
Figure 16B:
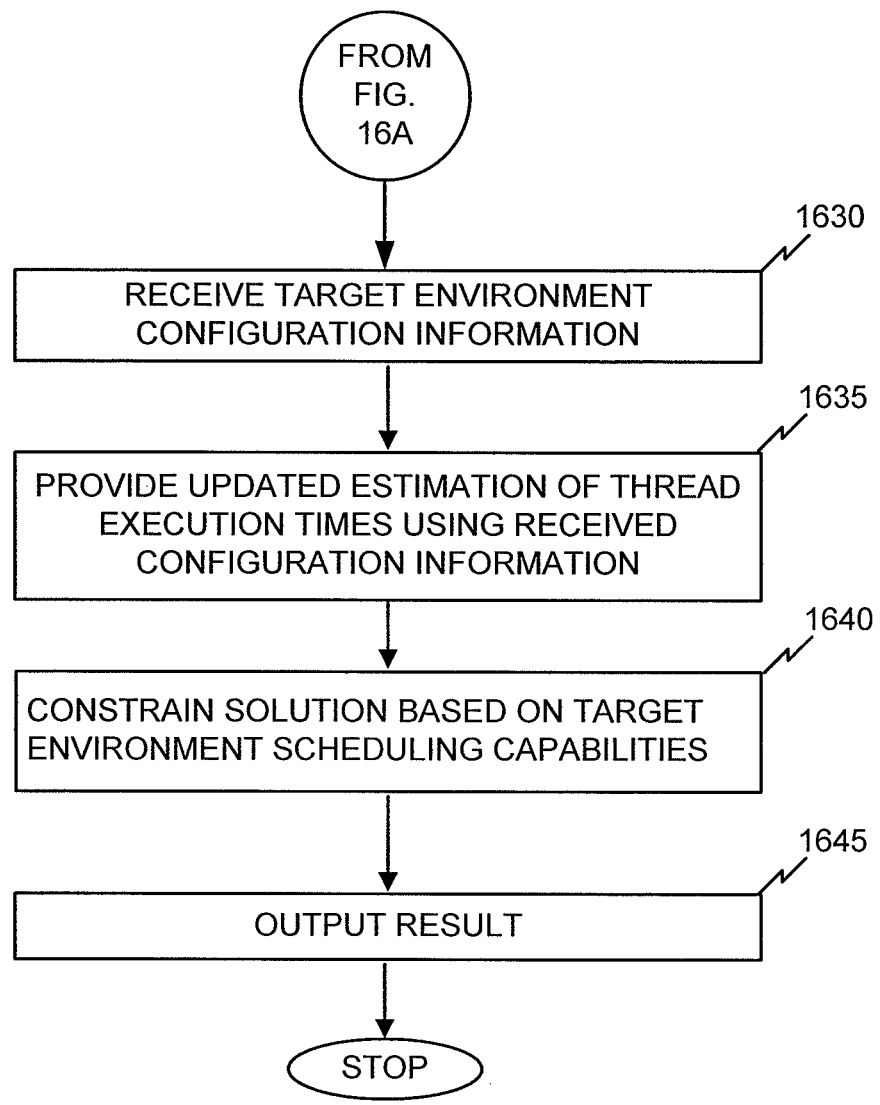

FIGS. 16A and B illustrate exemplary processing that can be used to perform schedulability analysis that takes into account target characteristics. Processing may begin by initiating an analysis engine that can evaluate information contained in an intermediate representation (act 1605). The analysis engine may load a call graph that is described in an intermediate representation (act 1610). The analysis engine may use an intermediate representation that is produced for another purpose, such as for code generation, or may use an intermediate representation that is produced specifically to support schedulability analysis.

The analysis engine may use the call graph to determine (1) a worst case code path execution time for each block in a model, (2) a best case code path execution time for each block in the model, or (3) a median and/or mean code path execution time for each block in the model (act 1615). The analysis engine may aggregate determined time information to, for example, a thread level (act 1620). For example, function-level timing information may be aggregated to a thread level (e.g., an entry point function of the code might define a unique thread).

The analysis engine may use the collected timing information to (1) identify imbalances in thread workloads, (2) report imbalances in thread workloads, or (3) determine alternative groupings that provide better workload balancing for parallel threads (act 1625). For example, in an embodiment, the analysis engine may use data dependency information to help balance workloads among parallel threads or to determine an alternative grouping of functions, etc., for particular parallel threads to balance workloads among the parallel threads.

The analysis engine may receive target environment configuration information (act 1630). For example, target environment 130 may send information to computer 110 in response to a query. Alternatively, computer 110 may retrieve a stored copy of target environment configuration from memory. In still another implementation, a user may manually enter target environment configuration information into computer 110 via input device 125.

The analysis engine may update an estimation of thread execution time based on the target environment configuration information. The analysis engine may provide the updated estimates of thread execution times to a user or to other components or applications running on computer 110 (act 1635). Scheduling solutions for generated code may be constrained based on scheduling capabilities of the target environment on which the generated code will be executed (act 1640). Results produced by the analysis engine, such as updated estimates of thread execution times, may be used to constrain the scheduling solution for the target environment. Results may be outputted to a user via a display device, stored in a storage medium, transmitted to a destination, printed, etc. (act 1645). The results may include outputs produced by the analysis engine and can include, for example, generated code that implements the constrained scheduling solution, the scheduling solution, etc.

The exemplary implementation may use a variety of techniques and/or data stores when performing schedulability analysis based on target environment characteristics. For example, a user may be working with a graphical model, such as a Simulink model, that includes blocks and connections (e.g., signal lines). The implementation may create an initial in-memory representation of the model. For example, model 510 (FIG. 5B) may be displayed to a user. Model 510 may include blocks 520A, 530A, 540A, and 550A and connections 560. The in-memory representation of model 510 may be represented in a memory using data structure 1710 (FIG. 17).

Referring now to FIG. 17, data structure 1710 may include pseudo code representations 1720 for block 520A, representation 1730 for block 530A, representation 1740 for block 540A, and representation 1750 for representation 550A. Data structure 1710 may not include annotations identifying thread allocation information. For example, the code segments of data structure 1710 may be executed serially on a single thread to produce a result. Schedulability analysis can be performed for the code segments based on the assumption that serial execution will be performed. If the schedulability analysis determines that serial execution cannot be performed within a determined interval, such as a time interval for real-time operation, then schedulability analysis may be performed to distribute processing among a number of threads to achieve parallel execution.

Figure 18:
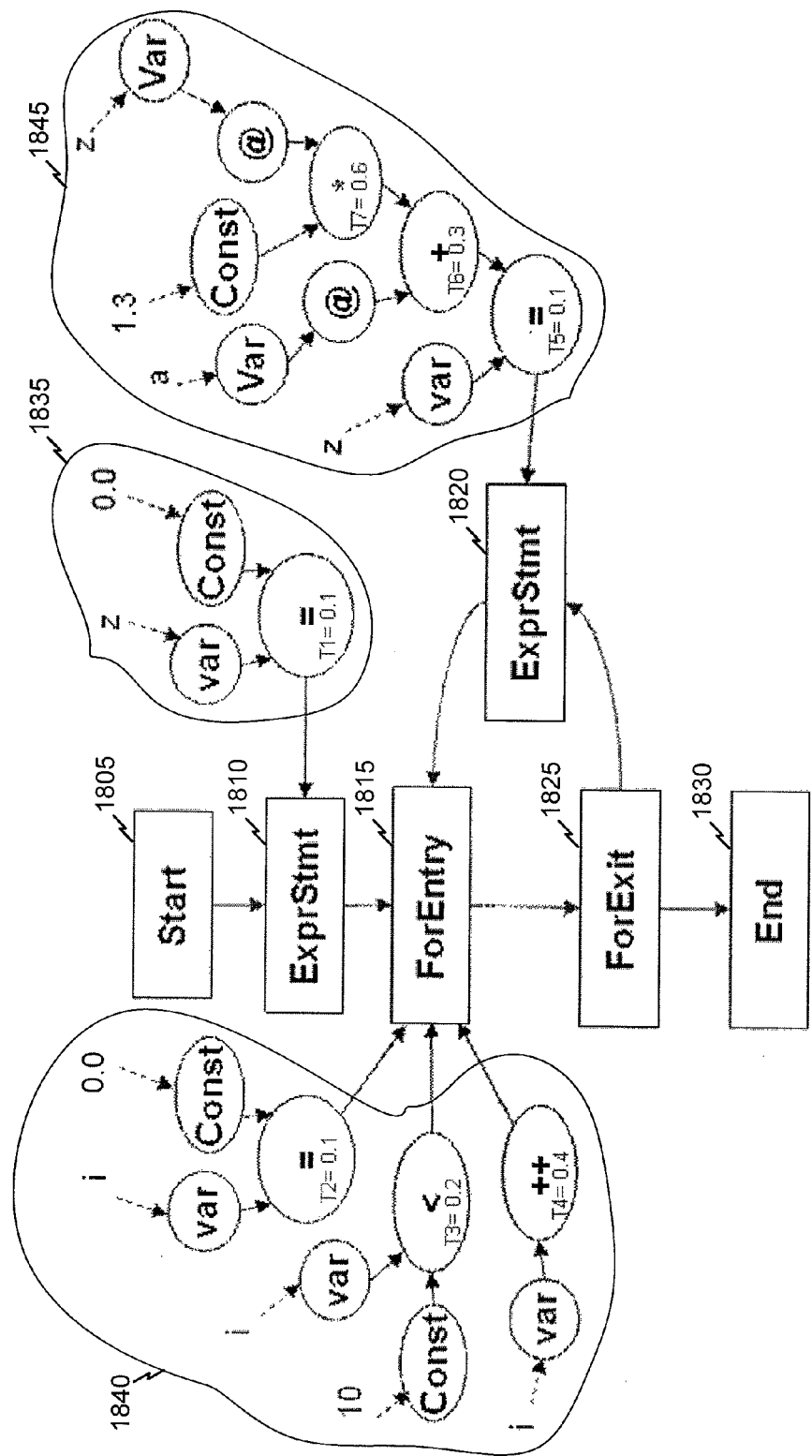
FIG. 18 illustrates an exemplary intermediate representation for the pseudo code of FIG. 17.

An implementation may create an in-memory intermediate representation that can include, for example, median timing information. Referring now to FIG. 18, an intermediate representation for block 540A of FIG. 17 is illustrated. The intermediate representation may include a workflow comprised of blocks 1805-1830 and intermediate representations 1835, 1840, and 1845.

Intermediate representations 1835, 1840 and 1845 can include nodes and edges (lines) that connect nodes and may also include arrows to show the flow of information. In FIG. 18, start block 1805 may initiate the workflow. At block 1810, an expression statement may be received. For example, intermediate representation 1835 may represent the expression z=0 of representation 1740 (FIG. 17). From intermediate representation 1835, it can also be determined that a time of 0.1 microseconds (μsec) is required to set z=0.

At block 1815, a FOR loop may be entered and at block 1825 the FOR loop may be exited. At block 1815, the expression for (i=0; i<10; i++) may be received via intermediate representation 1840. From intermediate representation 1840, it is seen that setting i=0 requires 0.1 μsec, i<10 requires 0.2 μsec, and i++ requires 0.4 μsec. Within the FOR loop, the expression z=a+1.3*z may be evaluated.

At block 1820, intermediate representation 1845 may be received. Within intermediate representation 1845, 1.3*z may take 0.6 μsec, adding a to 1.3*z may take 0.3 μsec, and z=a+1.3*z may take 0.1 μsec.

A total processing time for block 540A is represented by T1+T2+10(T3+T4+T5+T6+T7), which is 16.2 μsec. In some situations, 16.2 μsec may be an unacceptably long processing time for block 540A.

Exemplary implementations may use dependency analysis to help with schedulability analysis to identify a satisfactory execution schedule for block 540A. Now referring to FIG. 19, dependency table 1900 may include information about dependencies between blocks in a model. For example, from table 1900 it is determined that block 540A depends on variable a and provides variable z. Table 1900 also indicates that block 540A has a median processing time of 16.2 μsec. In an embodiment, table 1900 can be derived from pseudo code, such as the pseudo code illustrated in FIG. 17. Information in table 1900 can be sorted if desired, for example, code block timing may be sorted by media processing time.

Schedulability analysis may employ a heuristic, such as sorting blocks of code from a highest to a lowest median time. The analysis may allocate the sorted blocks of code to a thread/task until a thread-total-time is greater than thread-total-times for other threads. This approach may be repeated and may produce a concurrent thread allocation that is optimized with respect to concurrent thread allocations that are performed using another technique. Other implementations may use other sorting techniques (e.g., dynamic sorting techniques that can sort on substantially any attribute) and/or allocation techniques (e.g., cycling through available threads and assigning code blocks to the available threads from a list ordered based on descending times).

Figure 20:
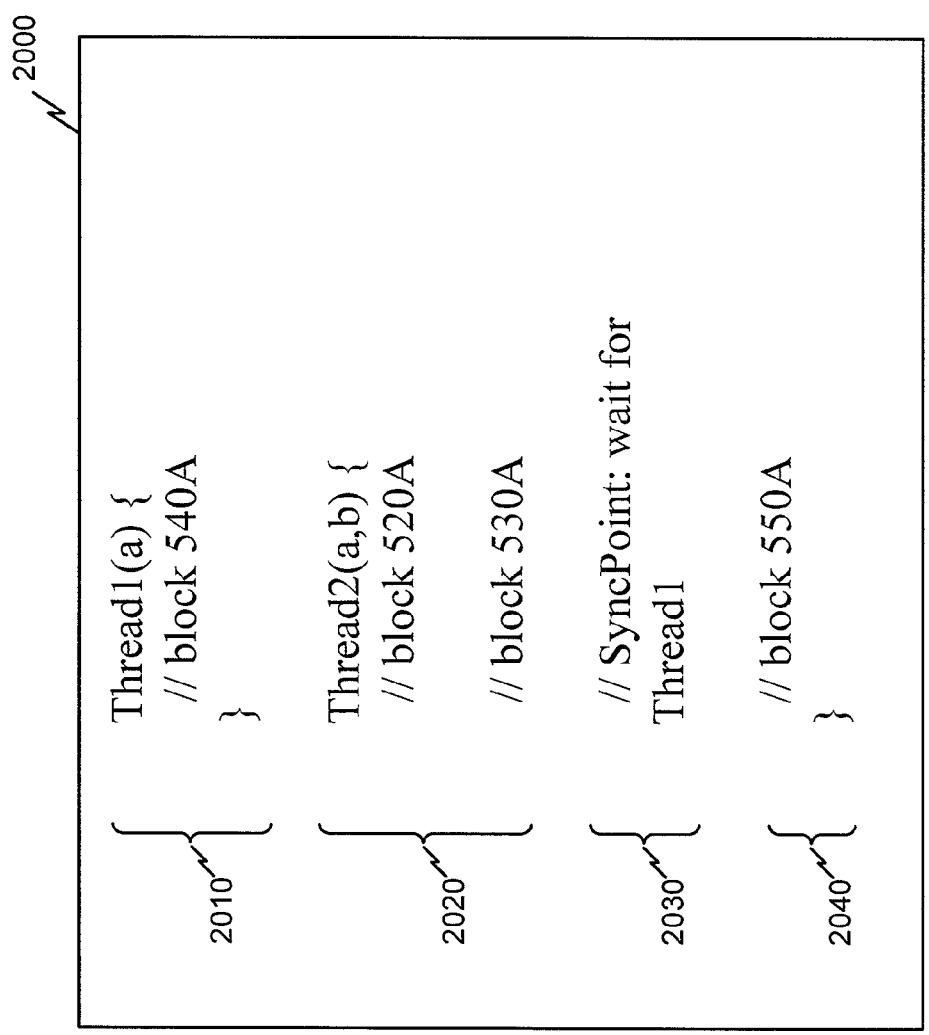
FIG. 20 illustrates an exemplary multi-threaded implementation of the invention.

FIG. 20 illustrates an exemplary GUI 2000 that can display thread allocations that are made using processing times for code blocks and/or data dependency information for the code blocks. In FIG. 20, representation 2010 may display information for a first thread (Thread1). For example, block 540A may be allocated to Thread1. Representation 2020 may indicate that Thread2 includes code for block 520A and 530A, and representation 2040 may indicate that code for block 550A is also allocated to Thread2. Implementations may identify the need for synchronization logic, such as a synchronization point, to synchronize the execution of threads. The use of synchronization logic ensures that proper data dependence is maintained and thus equivalent numerical results are achieved between the concurrent and sequential execution of the code. In FIG. 20, representation 2030 may indicate a synchronization point and may provide text explaining what the synchronization point is configured to accomplish.

Embodiments of the invention can be configured to evaluate designs to determine whether code for a design will operate in real-time or whether the code will operate in soft-real-time. Soft-real-time can refer to situations in which code does not execute fast enough to support real-time operation. As a result, code executing in soft-real-time may fall behind with respect to time so that a result is produced later than the result would be produced if the result were produced in real-time. Soft-real-time may also be characterized by over consumption of resources, such as memory, with respect to consumption of the resources if the code was executing in real-time. In some instances, a system may fall behind real-time operation when operating in soft-real-time and may catch up to real-time operation at a later time, such as when processing demands for the system decrease. For example, the amount of data that an application processes may change during execution of the application. And, depending on the amount of change, the application may operate in real-time or in soft-real-time. Therefore, a system operating in soft-real-time at a given time may not always operate in soft-real-time. Embodiments of the invention can factor system behaviors, such as these, into execution scheduling for generated code deployed to targets.

By way of example, an embodiment may evaluate a design to determine a worst case execution path and to determine non-worst case execution paths. The embodiment may determine that the worst case execution path can be handled in real-time when certain changes are made to hardware resources on which the code is executed and/or to code making up the program. The embodiment may further determine that the worst case execution path may be encountered infrequently, for example, 1% of the time when program code executes. It may also be determined that a non-worst case execution path may occur 99% of the time when program code executes.

In this example, configuring code to handle the worst case execution path in real-time may result in code that is less efficient when executing along non-worst case execution paths. Designing and scheduling program code to handle the worst case execution path may produce an application that runs in real-time but with less efficient non-worst case execution behavior. For example, a different processor or different amount of memory may be required to achieve a desired operating characteristic, performance, etc.

Embodiments of the invention can make determinations with respect to program code using static code analysis techniques, code profiling techniques (e.g., profiling techniques with respect to a target system), model coverage analysis techniques, etc. Embodiments can use analysis results to identify design tradeoffs and to make selections with respect to tradeoffs so as to produce a design that operates in a desired manner.

By way of example, with respect to the following code fragment
read(x);
while (x>0 && x<100){
  if (x=1) {fun1(y);} else {fun2(y);}
  x=x+1;
}
an integer variable x is read such that the value of x is uniformly distributed between 0 and 100. As long as x is between 0 and 100, a variable y may be operated on by one of two functions, fun1 and fun2. In the case where x equals 1, fun1 is applied and otherwise fun2 is applied. Whenever either fun1 or fun2 have been applied, the variable x is incremented till x reaches 100. Static analysis of this code fragment may reveal that fun1 can be applied at most 1% of the times that the while loop is entered because of the uniform distribution. If fun1 requires more processing than fun2, fun1 may determine how to achieve real-time execution. If soft-real-time execution at most 1% of the time is allowed, fun2 may determine how to achieve real-time execution.

Static analysis may include methods such as abstract interpretation, model checking, and constraint satisfaction solving. For example, a property may be formulated that states that an if branch of a conditional execution can be executed more than once for every 100 executions of the else branch. Static analysis may then prove this property false, and, therefore, the if branch cannot execute more than 1% of all the evaluations of the conditional. Conditional execution may be based on if statements, select statements, alternative (alt) statements, priority alternative (pri alt) statements, etc.

In alternative embodiments probabilities of executing fun 1 and/or fun 2 may be based on other parameters. For example, the probability of executing fun1 may be based on model coverage analysis, benchmarking, etc.

Continuing with the example above, an analysis result may indicate that a worst case execution path occurs infrequently with respect to non-worst case execution paths. The embodiment may use the analysis result to provide a recommendation that program code be optimized to handle the more frequent non-worst case execution paths in real-time and to allow the worst case execution path to operate in soft-real-time. Embodiments may further be configured to programmatically redesign code to optimize operation based on the analysis result, e.g., optimizing code to execute non-worst case execution paths in real-time so that the system will achieve real-time operation 99% of the time.

Figure 21:
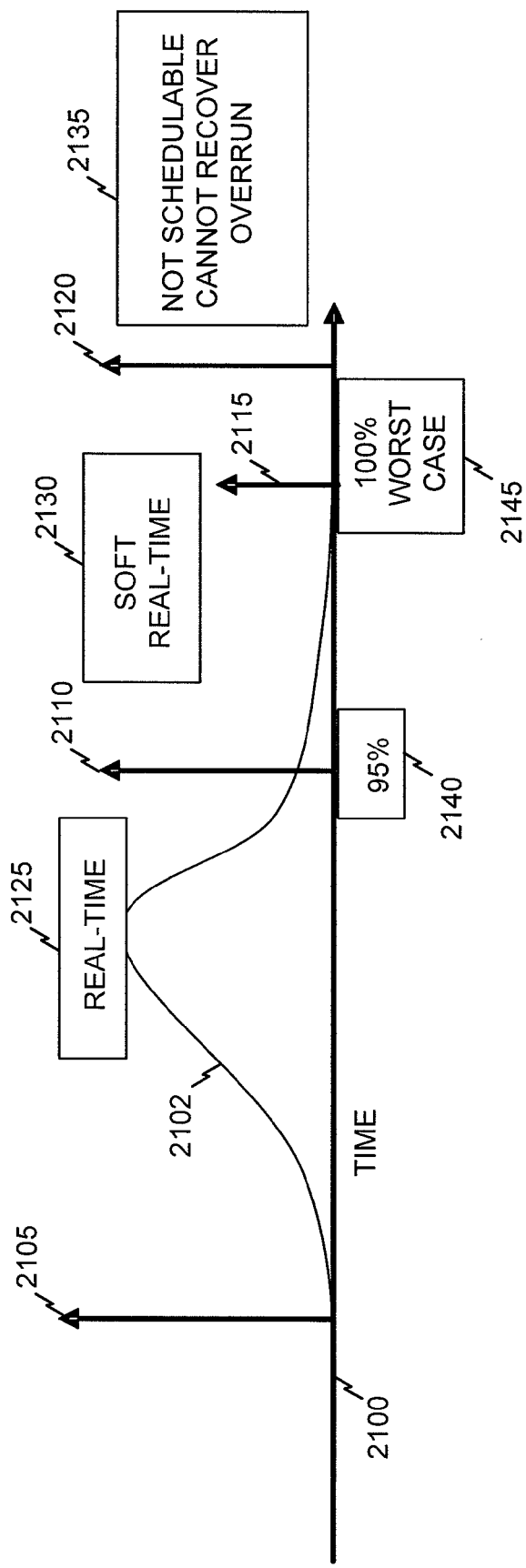
FIG. 21 illustrates a graphical representation for displaying information identifying real-time and soft-real time performance for scheduled code.

Embodiments can include graphical representations for providing users with information about how scheduled code will execute in an environment. For example, FIG. 21 illustrates a graphical representation showing information about code execution. FIG. 21 can display information with respect to an axis 2100. For example, axis 2100 can include identifier 2105 for indicating when executions of scheduled code begins, identifier 2110 for indicating a percentage of time at which a certain type of execution occurs. For example, a range between identifier 2105 and 2110 may indicate a real-time interval within which code executes in real-time. A trace 2102 may indicate characteristics of how scheduled code will execute, and real-time label 2125 can be used to identify the portion of trace 2102 that executes in real-time. Real-time label 2125 may further identify a real-time range between identifier 2105 and 2110. The real-time range may further include label 2140 for indicating a percentage of time over which code executes in real-time. For example, code associated with FIG. 21 achieves real-time execution 95% of the time.

A range between identifier 2110 and 2115 may indicate a soft real-time range over which soft real-time execution is achieved. Soft real-time range may include a portion of trace 2102 and/or a soft real-time label 2130. The soft real-time range may further include label 2145 for indicating when scheduled code will have finished executing 100% of the time. A user may determine that soft real-time execution occurs 5% of the time by subtracting a value in label 2140 from a value in label 2145.

FIG. 21 may include other labels and/or identifiers for providing users with additional information regarding scheduled code. For example, indicator 2120 may indicate a situation in which code cannot be scheduled because the code associated with identifier 2120 is to the right of the worst case identifier 2115. Label 2135 may include information related to identifier 2120, such as text indicating that the code is not schedulable and/or that the code cannot recover because an overrun is produced. Other embodiments can include other types of information that a user might find useful in understanding how scheduled code can execute within an environment.

Embodiments can further be configured to generate code consistent with analysis results performed prior to code generation. For example, the worst case and non-worst case execution path analyses may be made with respect to program code for an executable graphical model of a system that will be deployed to a target. When code scheduling is determined to be satisfactory, a code generator may generate code from the model and the generated code may be deployed to the target for execution in a target environment. The generated code may execute according to the schedule determined using the graphical modeling environment. Execution scheduling can further be used to mitigate undesirable conditions in a target environment. For example, execution scheduling can be configured to maintain silicon operation below a temperature threshold, mitigate hot spots in processing logic, etc.

CONCLUSION

Implementations may use target characteristics to perform execution scheduling for generated code adapted to execute in a target environment.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 10A and B, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIG. 1 or 2 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining the invention.

The scope of the invention is defined by the claims and their equivalents.

What is claimed is:

1. A non-transitory computer-readable medium storing instructions, the instructions comprising:
   one or more instructions which, when executed by at least one processor, cause the at least one processor to:
   determine, based on characteristics of a target, a schedule, of a plurality of schedules, to use for executing a first code portion, of a plurality of code portions, and a second code portion of the plurality of code portions;
   perform execution scheduling for the first code portion and the second code portion,
      the first code portion having a first execution rate,
      the second code portion having a second execution rate,
         the second execution rate being temporally related to the first execution rate, and
      the execution scheduling:
         accounting for the characteristics of the target,
         using the schedule, and
         accounting for optimizations by a generator associated with code related to the first code portion;
   schedule, based on performing the execution scheduling and using the schedule, execution of the first code portion and the second code portion;
   determine, based on scheduling the execution, if the schedule is acceptable; and
   selectively
      generate, when the schedule is acceptable, code associated with an executable model; or
      receive, when the schedule is not acceptable, one or more modifications to the schedule to create a modified schedule,
         the execution scheduling being further performed using the modified schedule,
         the modified schedule including information regarding execution of the first code portion and a third code portion,
         the modified schedule including information indicating that the first code portion and the third code portion are to be executed during a particular time period, and
         the execution of the first code portion and the third code portion being evaluated.

2. The medium of claim 1, where the first code portion executes in soft-real-time and the second code portion executes in real-time.

3. The medium of claim 1, where the execution scheduling accounts for an expected frequency of occurrence for executing the first code portion and the second code portion.

4. The medium of claim 1, where
   the first code portion executes in soft-real time on the target during a first time interval and executes in real-time during a second time interval, and
   the execution scheduling accounts for the soft-real-time execution.

5. The medium of claim 1, where the executable model comprises:
   a first block having a first size representing one or more of:
      a first duration of execution,
      a first execution rate,
      first memory usage information,
      first processing logic, or
      a temperature of the first processing logic; and
   a second block having a second size representing one or more of:
      a second duration of execution,
      a second execution rate,
      second memory usage information,
      second processing logic, or
      a temperature of the second processing logic.

6. The medium of claim 1, where the executable model includes a block, a first signal line and a second signal line, where:
   a location of the first signal line indicates an order of execution for a first block providing an output signal to the block, and
   a location of the second signal line indicates an order of execution for a second block providing an output signal to the block.

7. The medium of claim 6, where the location of the first signal line and the location of the second signal line are determined with respect to the block.

8. The medium of claim 1, where the executable model includes a block, and the block is associated with an identifier indicating processing logic on which code for the block executes.

9. The medium of claim 1, where:
the first code portion is associated with a first group of blocks in the executable model, and
the second code portion is associated with a second group of blocks in the executable model.

10. The medium of claim 9, where:
blocks included in the first group of blocks are programmatically determined using the executable model, and
the programmatically determining accounts for real-time execution of the generated code for the first code portion on the target.

11. The medium of claim 10, where the first group of blocks executes on first processing logic on the target and the second group of blocks executes on second processing logic on the target.

12. The medium of claim 1, where the first code portion includes two or more code segments, where:
a first code segment, of the two or more code segments, operates at a first rate, and
a second code segment, of the two or more code segments, operates at a second rate when the generated code executes on the target.

13. The medium of claim 12, where the second rate is offset with respect to the first rate.

14. The medium of claim 1, where the instructions further include:
one or more instructions to provide benchmarking code to the target; and
one or more instructions to receive a benchmarking result from the target.

15. The medium of claim 14, where the instructions further include:
one or more instructions to use the benchmarking result to identify probabilities that an execution path in the generated code will produce an overrun.

16. The medium of claim 1, where the instructions further include:
one or more instructions to produce an execution result using the executable model; and
one or more instructions to compare the execution result to a target result produced by the target when the generated code executes on the target.

17. The medium of claim 16, where the instructions further include:
one or more instructions to determine whether the execution result and the target result are equivalent.

18. The medium of claim 1, where the first code portion includes a task that has been remapped.

19. The medium of claim 1, where a clock for the first code portion is delayed with respect to a clock for the second code portion when the generated code executes on the target.

20. The medium of claim 1, where the execution scheduling accounts for a portion of the characteristics of the target.

21. The medium of claim 1, where the first code portion and the second code portion are alternative branches of a conditional execution.

22. The medium of claim 1, where the execution scheduling accounts for an expected frequency of occurrence for executing the first code portion or the second code portion.

23. The medium of claim 22, where the expected frequency of occurrence is determined based on at least one of static analysis and model coverage analysis.

24. The medium media of claim 1, where the executable model includes:
a block, and
a first signal line, where:
the first signal line has a location with respect to the block,
the first signal line represents an input signal for the block, and
the location of the first signal line indicates a point of execution for the block.

25. The medium of claim 24, where the executable model includes:
a second block, and
a second signal line, where:
the second signal line has a location with respect to the second block,
the location of the second signal line indicates a point of execution with respect to the second block, and
the second signal line provides an output signal from the second block to the first block using the first signal line.

26. A method comprising:
accessing a report comprising:
a first model component, in a graphical model, comprising:
a first code portion:
executed when the first model component executes in the graphical model,
related to a first generated code portion,
the first generated code portion created when code is generated for the first model component, and
being associated with a first execution rate;
a second model component, in the graphical model, comprising:
a second code portion:
executed when the second model component executes in the graphical model,
related to a second generated code portion,
the second generated code portion created when code is generated for the second model component, and
being associated with a second execution rate;
a first identifier:
associated with the first model component, and
identifying a first execution characteristic:
related to the first execution rate,
determined based on schedulability analysis performed with respect to the first model component or the first generated code portion, and
indicating how the first model component or the first generated code portion executes when the graphical model or the first generated code portion is executed; and
a second identifier:
associated with the second model component, and
identifying a second execution characteristic:
related to the second execution rate,
determined based on schedulability analysis performed with respect to the second model component or the second generated code portion, and
indicating how the second model component or the second generated code portion executes when the graphical model or the second generated code portion is executed,
the accessing being performed by a computing device;

determining, based on the schedulability analysis performed with respect to the first model component or the first generated code portion and the schedulability analysis performed with respect to the second model component or the second generated code portion, if a schedule is acceptable,
the determining being performed by the computing device; and
selectively
generating, when the schedule is acceptable, code associated with the graphical model,
the generating being performed by the computing device; or
receiving, when the schedule is not acceptable, one or more modifications to the schedule to create a modified schedule,
the execution scheduling being further performed using the modified schedule,
the receiving being performed by the computing device,
the modified schedule including information regarding execution of the first model component or the first generated code portion and one of:
a third model component or a third generated code portion,
the modified schedule including information indicating that the first model component or the first generated code portion and the one of the third model component or the third generated code portion are to be executed during a particular time period, and
the execution of the first model component or the first generated code portion and the one of the third model component or the third generated code portion being evaluated.

27. The method of claim 26, where the report is contained in a data store or a graphical user interface.

28. The method of claim 26, where the first identifier is a color, a textual identifier, or a pattern.

29. The method of claim 28, where the first identifier indicates a processing resource on which the first model component or the first generated code portion executes.

30. The method of claim 26, where the first execution characteristic indicates whether the first model component or the first generated code portion executes in real-time or soft-real-time.

31. The method of claim 26, where:
the first identifier indicates that a clock for the first model component is delayed with respect to a clock for the second model component, or
the first generated code portion is delayed with respect to a clock for the second generated code portion.

32. A device comprising:
a memory to store instructions; and
a processor to execute the instructions to:
perform execution scheduling for a first code portion and a second code portion,
the first code portion having a first execution rate,
the second code portion having a second execution rate,
the second execution rate being temporally related to the first execution rate, and
the execution scheduling:
accounting for first target environment characteristics obtained from a first target,
accounting for second target environment characteristics associated with a second target,
using an execution schedule,
accounting for optimizations related to the first code portion or the second code portion, and
producing an execution schedule;
schedule, based on performing the execution scheduling using the execution schedule, execution of:
the first code portion on the first target using executable code generated from the graphical model, and
the second code portion on the second target using executable code generated from the graphical model;
determine, based on scheduling the execution, if the schedule is acceptable; and
selectively
generate, when the schedule is acceptable, code associated with the graphical model; or
receive, when the schedule is not acceptable, one or more modifications to the schedule to create a modified schedule,
the execution scheduling being further performed using the modified schedule,
the modified schedule including information regarding execution of the first code portion and a third code portion,
the modified schedule including information indicating that the first code portion and the third code portion are to be executed during a particular time period, and
the execution of the first code portion and the third code portion being evaluated.

33. The device of claim 32, where the first target and the second target operate in a cluster.

34. The device of claim 32, where at least one of the first target environment characteristics or the second target environment characteristics relate to power.

35. The device of claim 32, where at least one of the first target environment characteristics or the second target environment characteristics relate to at least one of processor cost, processor idle time, or temperature.

36. A non-transitory computer-readable medium storing instructions, the instructions comprising:
one or more instructions which, when executed by at least one processor, cause the at least one processor to:
perform execution scheduling for:
a first code portion having a first execution rate,
the execution scheduling:
accounting for target environment characteristics obtained from a target,
using an execution schedule,
accounting for soft-real-time execution characteristics of the first code portion, and
performing optimization operations with respect to the first code portion;
schedule, based on performing the execution scheduling and using the execution schedule, execution of the first code portion in generated executable code;
determine, based on scheduling the execution, if the execution schedule is acceptable; and
selectively
generate, when the execution schedule is acceptable, code associated with an executable model; or
receive, when the execution schedule is not acceptable, one or more modifications to the execution schedule to create a modified execution schedule,
the execution scheduling being further performed using the modified execution schedule, the modified schedule including information regarding execution of the first code portion and a second code portion, the modified schedule including information indicating that the first code portion and the second code portion are to be executed during a particular time period, and the execution of the first code portion and the second code portion being evaluated.

37. The medium of claim 36, where the first code portion executes in soft-real-time and a second code portion executes in real-time.

38. The medium of claim 36, where the first code portion executes in soft-real time on the target during a first time interval and executes in real-time during a second time interval.

* * * * *